(12) United States Patent  (10) Patent No.: US 8,479,854 B1
Gagnon  (45) Date of Patent: Jul. 9, 2013

(54) OFF-ROAD WHEELED VEHICLE AIR INDUCTION SYSTEM

(75) Inventor: Marc Gagnon, Austin (CA)

(73) Assignee: Bombardier Recreational Products Inc., Valcourt (CA)

( * ) Notice: Subject to any disclaimer, the term of this patent is extended or adjusted under 35 U.S.C. 154(b) by 98 days.

(21) Appl. No.: 13/155,959

(22) Filed: Jun. 8, 2011

(51) Int. Cl.
*B60K 13/02* (2006.01)

(52) U.S. Cl.
USPC .......................................................... 180/68.3

(58) Field of Classification Search
USPC .................. 180/68.3; 123/184.24, 184.47
See application file for complete search history.

(56) References Cited

U.S. PATENT DOCUMENTS

| | | | |
|---|---|---|---|
| 6,499,461 B2 * | 12/2002 | Kubota et al. | 123/361 |
| 6,990,941 B1 * | 1/2006 | Bender | 123/184.21 |
| 7,287,619 B2 * | 10/2007 | Tanaka et al. | 180/291 |
| 7,565,944 B2 * | 7/2009 | Sakamoto et al. | 180/426 |
| 7,753,427 B2 * | 7/2010 | Yamamura et al. | 296/63 |
| 2007/0234842 A1 * | 10/2007 | Elliott | 74/513 |
| 2009/0302590 A1 * | 12/2009 | Van Bronkhorst et al. | 280/756 |
| 2011/0240250 A1 * | 10/2011 | Azuma | 165/51 |

FOREIGN PATENT DOCUMENTS

WO  2009096977 A1  8/2009

\* cited by examiner

*Primary Examiner* — Jeffrey J Restifo
*Assistant Examiner* — Erez Gurari
(74) *Attorney, Agent, or Firm* — BCF LLP

(57) ABSTRACT

An off-road vehicle has a frame, a cockpit area, a roll cage, driver and passenger seats disposed side-by-side, an engine, four wheels, and a steering device. A throttle pedal is disposed forwardly of the driver seat below the steering device. A throttle pedal position sensor senses a position of the pedal and is connected to a control unit for sending a throttle pedal position signal to the control unit. A throttle body, having a valve, is fluidly connected to an air intake conduit that is fluidly connected to the engine. An electric motor is operatively connected to the valve for positioning the valve. The control unit controls an operation of the electric motor based at least in part on the throttle pedal position signal. The electric motor is disposed rearwardly of the throttle pedal position sensor and forwardly of the engine.

16 Claims, 17 Drawing Sheets

OFF-ROAD WHEELED VEHICLE AIR INDUCTION SYSTEM

TECHNICAL FIELD

The present invention relates generally to an air induction system for an off-road wheeled vehicle.

BACKGROUND

Recreational utility vehicles (RUVs) generally have an open cockpit area with side-by-side seating. They are often referred to as side-by-side All-Terrain Vehicles (ATVs).

To control the speed of an RUV, the driver actuates a pedal similar to those found in cars. In many RUVs, the pedal is mechanically linked to the throttle body to open and close a valve of the throttle body, thereby control a flow of air through the air induction system of the engine.

However, the use of mechanical links to actuate the throttle valve limits the areas where the throttle body can be located, thus potentially making access to the throttle body difficult, and/or the mechanical connecting has to be complex, thus making its assembly and maintenance time consuming.

One solution to the above consists in using a throttle-by-wire system where an electric motor is used to open and close the valve of the throttle motor. The electric motor is controlled based on a signal from a sensor sensing a position of the throttle pedal.

RUVs usually operate in an environment that can be dusty, wet and/or muddy. These elements can adversely affect the performance of the electric motor.

Therefore, there is a need for an off-road vehicle with an air induction system using a throttle-by-wire system, with the electric motor located so as to reduce its exposure to the above elements, while remaining relatively easily accessible for assembly and maintenance.

SUMMARY

It is an object of the present to provide an open cockpit recreational vehicle with an air induction system using a throttle-by-wire system, with an electric motor operating a valve of a throttle body of the air induction system being located disposed rearwardly of a throttle pedal position sensor and forwardly of the engine of the vehicle.

In one aspect, the present provides an off-road vehicle having a frame, a cockpit area defined in the frame, a roll cage connected to the frame, the roll cage covering at least in part the cockpit area, a driver seat and a passenger seat disposed side-by-side in the cockpit area, the seats being covered by the roll cage, and two lateral sides. The cockpit area is disposed between the two lateral sides. Each of the two lateral sides includes a lateral passage disposed near a corresponding one of the two seats. The lateral passages is adapted to allow ingress and egress from the cockpit area. An engine is supported by the frame. Two front wheels and two rear wheels are supported by the frame. At least two of the wheels are operatively connected to the engine for propelling the vehicle. A steering device is disposed generally forward of the two seats. The steering device is operatively connected to at least two of the wheels for steering the vehicle. A control unit is connected to the engine for controlling an operation of the engine. A throttle pedal is disposed forwardly of the driver seat below the steering device. A throttle pedal position sensor senses a position of the throttle pedal. The throttle pedal position sensor is connected to the control unit for sending a throttle pedal position signal representative of the sensed throttle pedal position to the control unit. An air intake conduit is fluidly connected to an air intake port of the engine. A throttle body is fluidly connected to the air intake conduit. The throttle body includes a valve. A position of the valve regulates a flow of air to the air intake conduit. An electric motor is operatively connected to the valve for positioning the valve in the throttle body. The electric motor is connected to the control unit. The control unit controls an operation of the electric motor based at least in part on the throttle pedal position signal. The electric motor is disposed rearwardly of the throttle pedal position sensor and forwardly of the engine.

In an additional aspect, the electric motor is vertically higher than the engine.

In a further aspect, the electric motor is vertically higher than a front of the driver and passenger seats.

In an additional aspect, the electric motor is disposed forwardly of the driver and passenger seats.

In a further aspect, the air intake conduit is disposed laterally between the driver and passenger seats.

In an additional aspect, the electric motor is disposed laterally between the driver and passenger seats.

In a further aspect, central axes of the throttle body and of the air intake conduit are parallel to a longitudinal centerline of the vehicle.

In an additional aspect, the air intake conduit is generally ellipsoidal.

In a further aspect, a continuously variable transmission (CVT) is operatively connected to the engine. The CVT and the electric motor are disposed on opposite sides of a longitudinal centerline of the vehicle.

In an additional aspect, a console is positioned between the driver seat and the passenger seat. The console defines in part a central cooling tunnel The electric motor is disposed inside the central cooling tunnel.

For purposes of this application the term "recreational utility vehicle" (RUV) refers to an "opened" wheeled vehicle (contrary to a pickup truck which is a "closed" vehicle due to its closed passenger cabin) designed for off-road use which usually has side-by-side seating.

Also, terms related to spatial orientation such as forwardly, rearwardly, frontal, rear, upper, lower, left, and right, are as they would normally be understood by a driver of the vehicle sitting thereon in a normal driving position.

Embodiments of the present invention have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

Further features and advantages of the present invention will become apparent from the following detailed description, taken in combination with the appended drawings, in which.

DETAILED DESCRIPTION

The present will be described with respect to a recreational utility vehicle (RUV). However it should be understood that the present could be used on other types of off-road vehicles having an open cockpit area.

Figure 1:
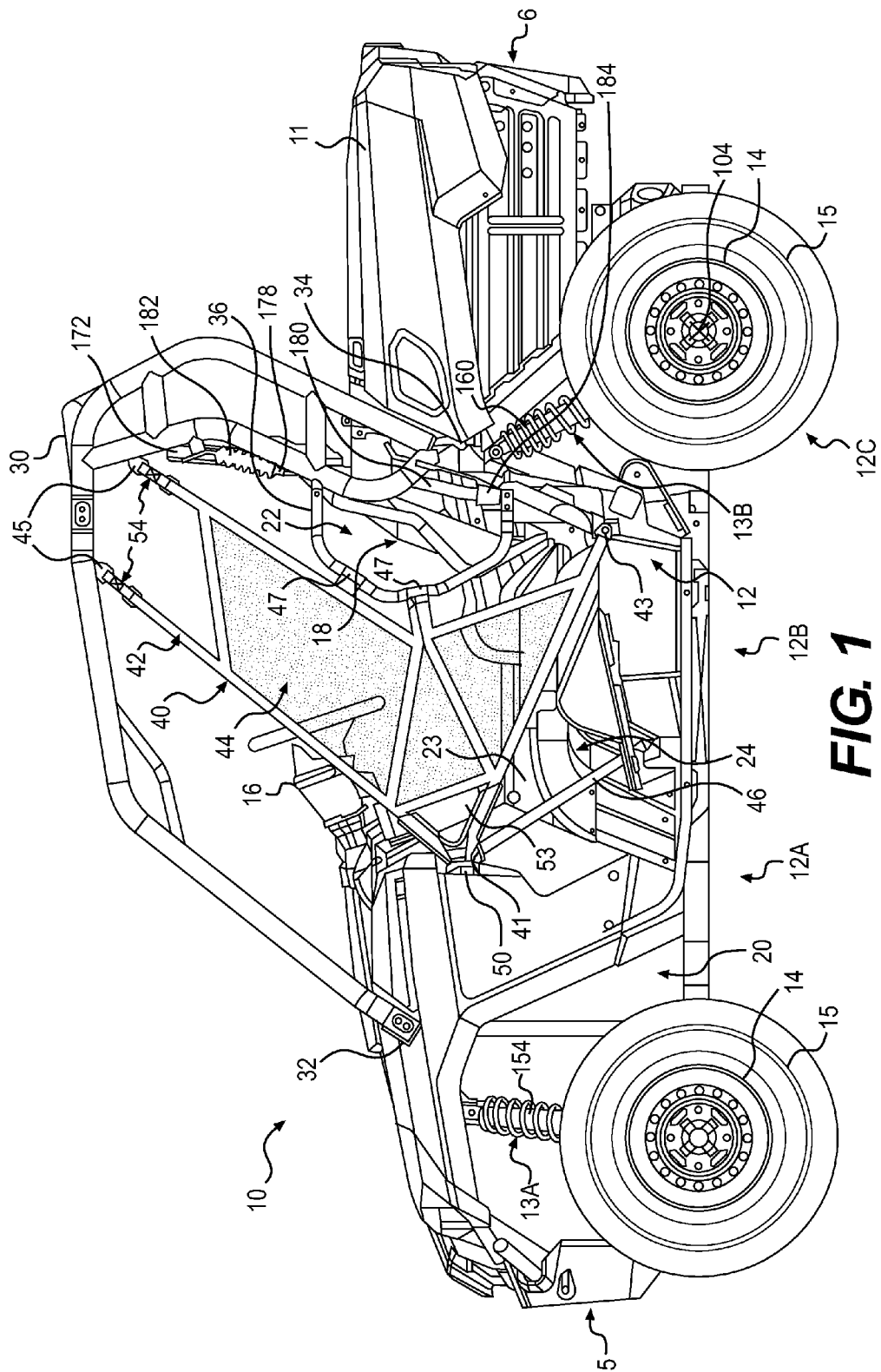
FIG. 1 is a left side elevation view of an RUV, with fairings partially removed for clarity.
Figure 2:
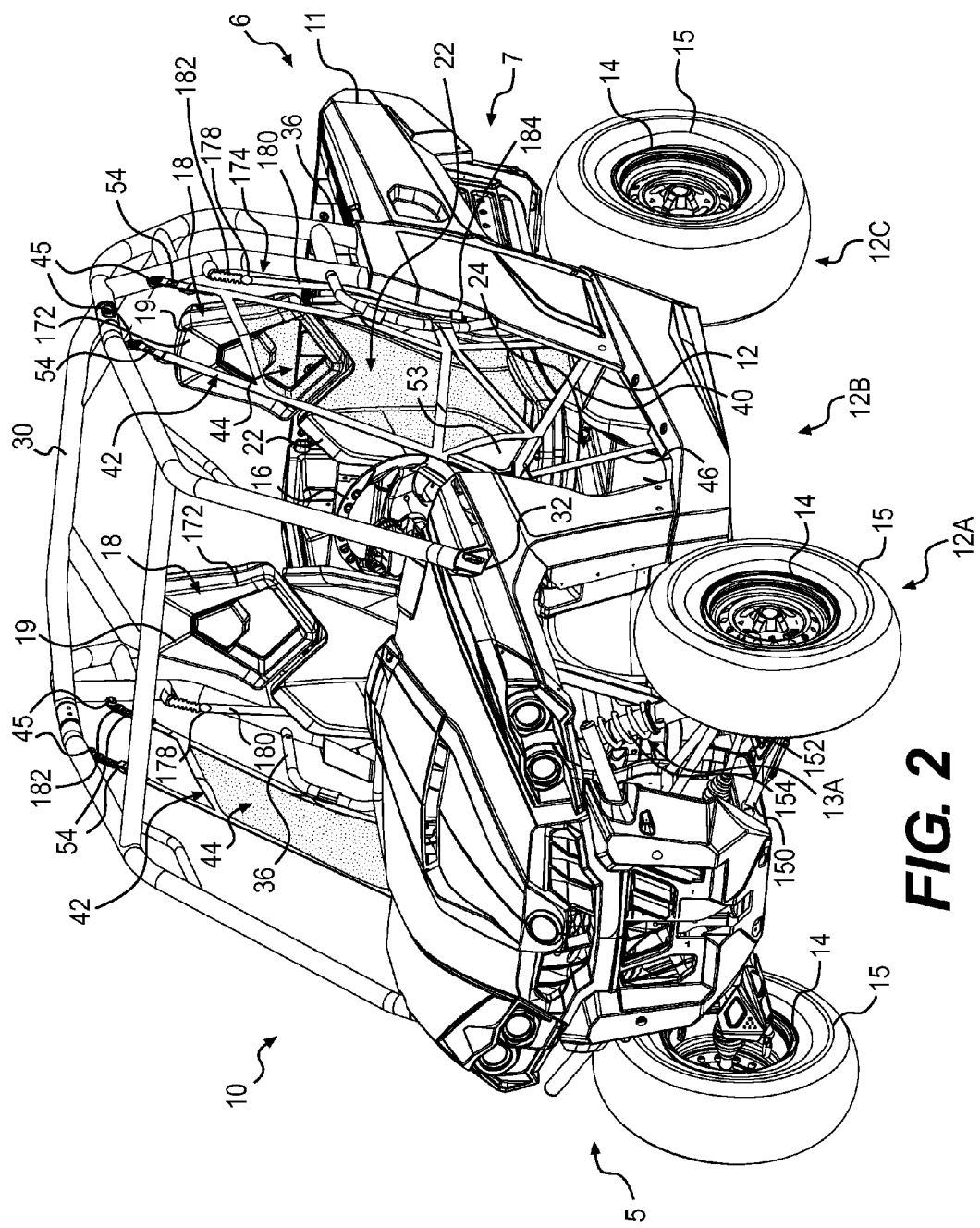
FIG. 2 is a perspective view, taken from a front left side, of the RUV of FIG. 1.
Figure 3:
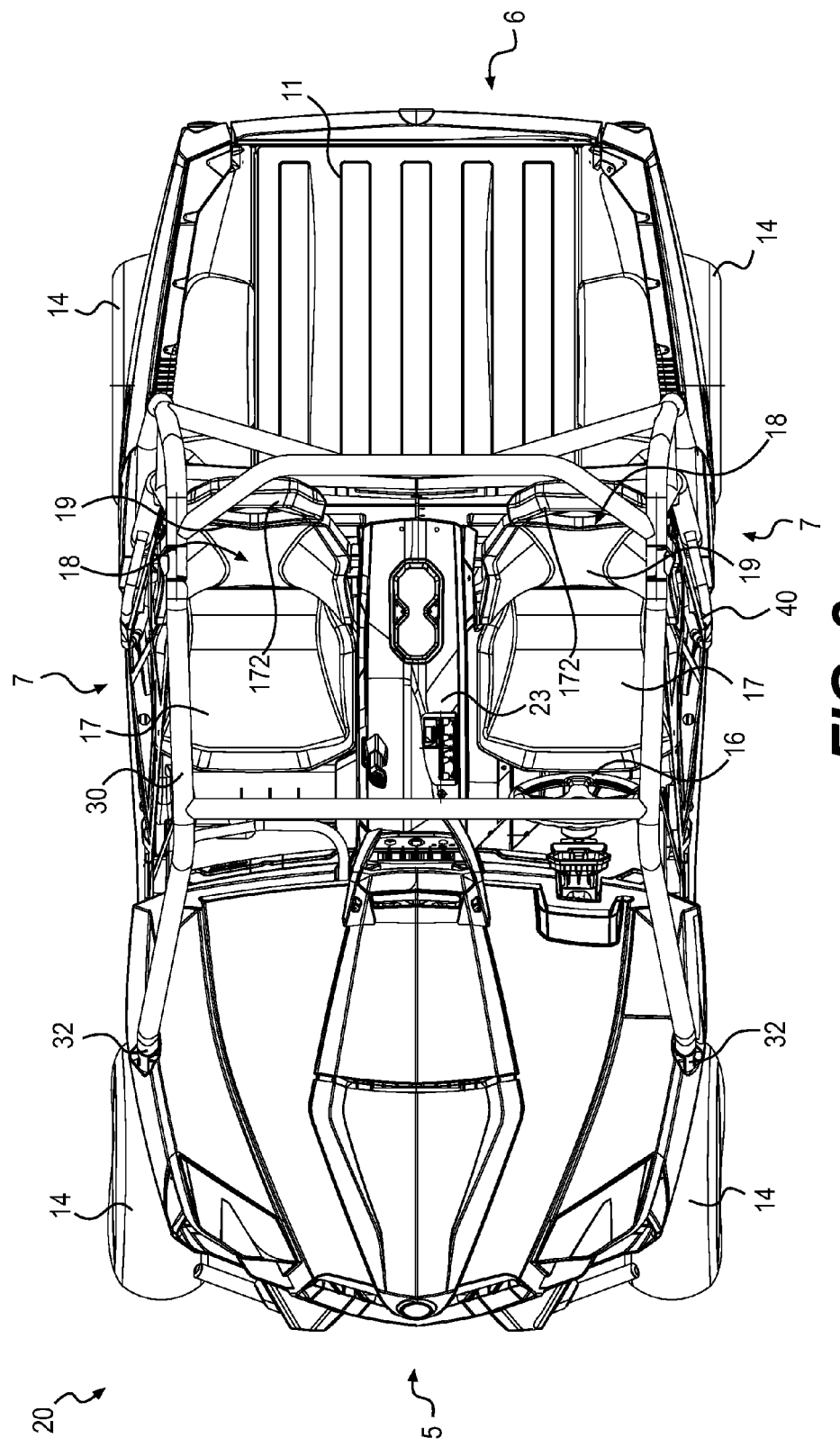
FIG. 3 is a top plan view of the RUV of FIG. 1.

FIGS. 1 to 3 illustrate an RUV 10 having a front end 5 a rear end 6, and two lateral sides 7 (left and right). The RUV 10 includes a frame 12 to which a vehicle body is mounted. The frame 12 has a front portion 12A, a middle portion 12B and a rear portion 12C. A pair of front wheels 14 is suspended from the front portion 12A of the frame 12 via front suspensions 13A. A pair of rear wheels 14 is suspended from the rear portion 12C of the frame 12 via rear suspensions 13B. Each of the four wheels 14 has a tire 15. A cockpit area 22 is disposed in the middle portion 12B of the frame 12. The cockpit area 22 comprises two seats 18 (left and right). Each seat 18 has a seat base 17 and a backrest 19. The left and right seats 18 are mounted laterally beside each other to accommodate a driver and a passenger (riders), respectively, of the RUV 10. The seats 18 are bucket seats. It is contemplated that the seats 18 could be other types of recumbent seats. The cockpit area 22 is open at the two lateral sides 7 of the RUV 10, forming two lateral passages 24 (left and right), through which the riders can ingress and egress the RUV 10. A lateral cover 40 is selectively disposed across each lateral passages 24. The lateral cover 40 extends vertically from the roll cage 30 to a point vertically lower than the seat base 17. It is contemplated that only one of the two lateral passages 24 could be selectively partially covered by a lateral cover 40. The lateral covers 40 are made of flexible straps 42 and flexible panels 44 of meshed material. As it will be explain below, when the riders are riding the RUV 10, the lateral cover 40 is intended to be disposed across the lateral passage 24. However, when the riders are not riding the RUV 10 and they desire either ingress or egress the cockpit area 22, the lateral cover 40 can be opened to clear the lateral passage 24.

A roll cage 30 is connected to the frame 12 and is disposed above the cockpit area 22. The roll cage 30 is an arrangement of metal tubes that contributes to protecting the riders in the event the vehicle rolls over. The roll cage 30 has several attachment points to the frame 12. Toward the front 5 of the RUV 10, the roll cage 30 connects to the frame 12 at front attachment points 32 (left and right). The front attachment points 32 are located longitudinally between a roll axis of the front wheels 14 and a foremost point of the seats 18. Toward the rear 6 of the RUV 10, the roll cage 30 connects to the frame 12 at rear attachment points 34 (left and right). The rear attachment points 34 are located longitudinally between a roll axis of the rear wheels 14 and the rearmost point of the seat base 17 of the seats 18. The roll cage 30 further includes a pair of lateral restraining members 36, one on each side of a rear part of the roll cage 30. The lateral restraining members 36 extend forward from the rear part of the roll cage 30 partially into the lateral passages 24. The lateral restraining members 36 are U-shaped tubes which protect an upper body of the riders during leaning or roll-over. It is contemplated that the lateral restraining members 36 could have a different shape. It is also contemplated that the restraining members 36 could be omitted.

A steering device 16 including a steering wheel is disposed in front of the left seat 18. It is contemplated that, the steering wheel could be disposed in front of the right seat 18. The steering device 16 is operatively connected to the two front wheels 14 to permit steering of the RUV 10.

A cargo box 11 is pivotally mounted to the frame 12 rearwardly of the seats 18. It is contemplated that the cargo box 11 could be omitted.

With reference to FIGS. 8 to 13, internal components of the vehicle 10 will be described in more detail.

An engine 29 is mounted to the middle portion 12B of frame 12 and has a portion disposed between the right and the left seats 18. The engine 29 is operatively connected to the four wheels 14 to power the RUV 10 as will be described in greater detail below. It is contemplated that the engine 29 could be operatively connected only to the front wheels 14 or only to the rear wheels 14 or could selectively switch between driving two and four wheels 14. A console 23 (FIG. 3) positioned between the right and left seats 18 covers and separates the engine 29 from the driver and the passenger. The console 23 defines in part a central cooling tunnel allowing air to flow from the front end 5 of the vehicle 10 to the rear end 6 of the vehicle to cool the engine 29. International Patent Publication Number WO 2009/096977 A1, published Aug. 6, 2009, the entirety of which is incorporated herein by reference, describes a cooling tunnel for an RUV similar to the one defined by the console 23 for the RUV 10. The engine 29 is a four-stroke V-twin engine. Accordingly, the engine 29 has two cylinders 60 extending at an angle from each other. It is contemplated that other types of engines could be used. For example, the engine 29 could be a two-stroke engine with in-line cylinders.

Figure 8:
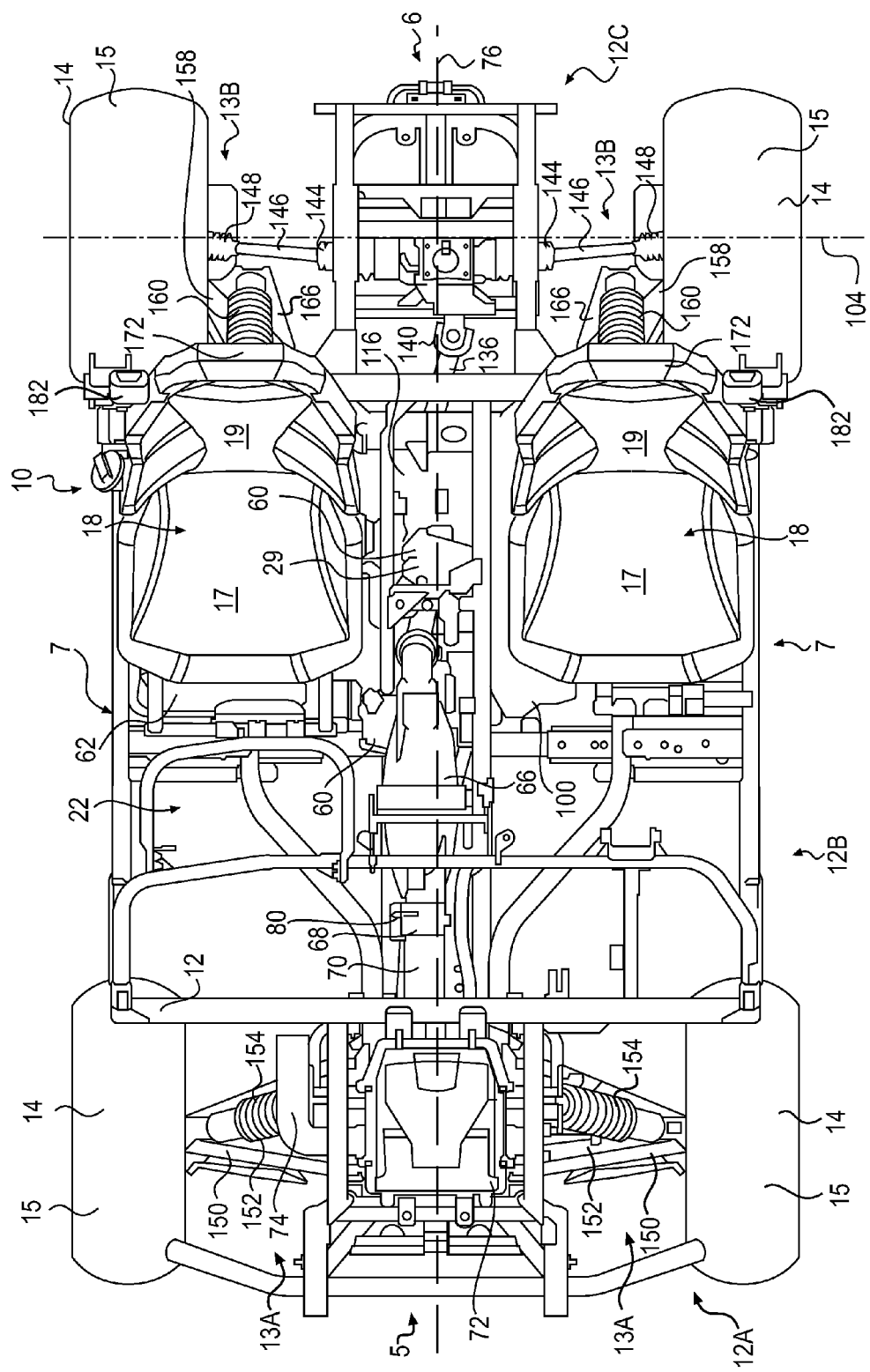
FIG. 8 is a top plan view of some internal components of the RUV of FIG. 1.

Fuel to be supplied to the engine 29 is stored in a fuel tank 62. The fuel tank is mounted to the middle portion 12B of the frame 12. As best seen in FIG. 8, the fuel tank 62 is disposed under the passenger seat 18.

Air is supplied to the engine 29 via air induction system. The air induction system includes an intake manifold 64 connected to both cylinders 60, an intake conduit 66 connected upstream of the intake manifold 64 (FIG. 12), a throttle body 68 connected upstream of the intake conduit 66, an intake conduit 70 connected upstream of the throttle body 68, an air box 72 connected upstream of the intake conduit 70, and a right-angle intake conduit 74 connected upstream of the air box 72. When the engine 29 is operating, air flows consecutively through the right-angle conduit 74, the air box 72, the intake conduit 70, the throttle body 68, the intake conduit 66, the intake manifold 64 and then enter the air intake ports of the cylinders 60 of the engine 29. As can be seen in FIG. 8, the air box 72, the intake conduit 70, the throttle body 68, and the intake conduit 66 are arranged in-line such that a longitudinal centerline 76 of the vehicle 10 extends through these elements and that the longitudinal axes of these elements are parallel to the longitudinal centerline 76. Furthermore, the intake conduit 70, the throttle body 68, and the intake conduit 66 are disposed laterally between the driver and passenger seats 18 so as to be covered by the console 23.

As can be seen in FIG. 8, the right-angle intake conduit 74 is connected to a lateral side of the air box 72 and has an opened end facing toward a rear of the vehicle 10. This limits the introduction of dust and/or water into the induction system as the vehicle 10 is moving forward. The air box 72 contains at least one air filter (not shown) therein to filter dust and other foreign particles from the air to be supplied to the engine 29.

Figure 16:
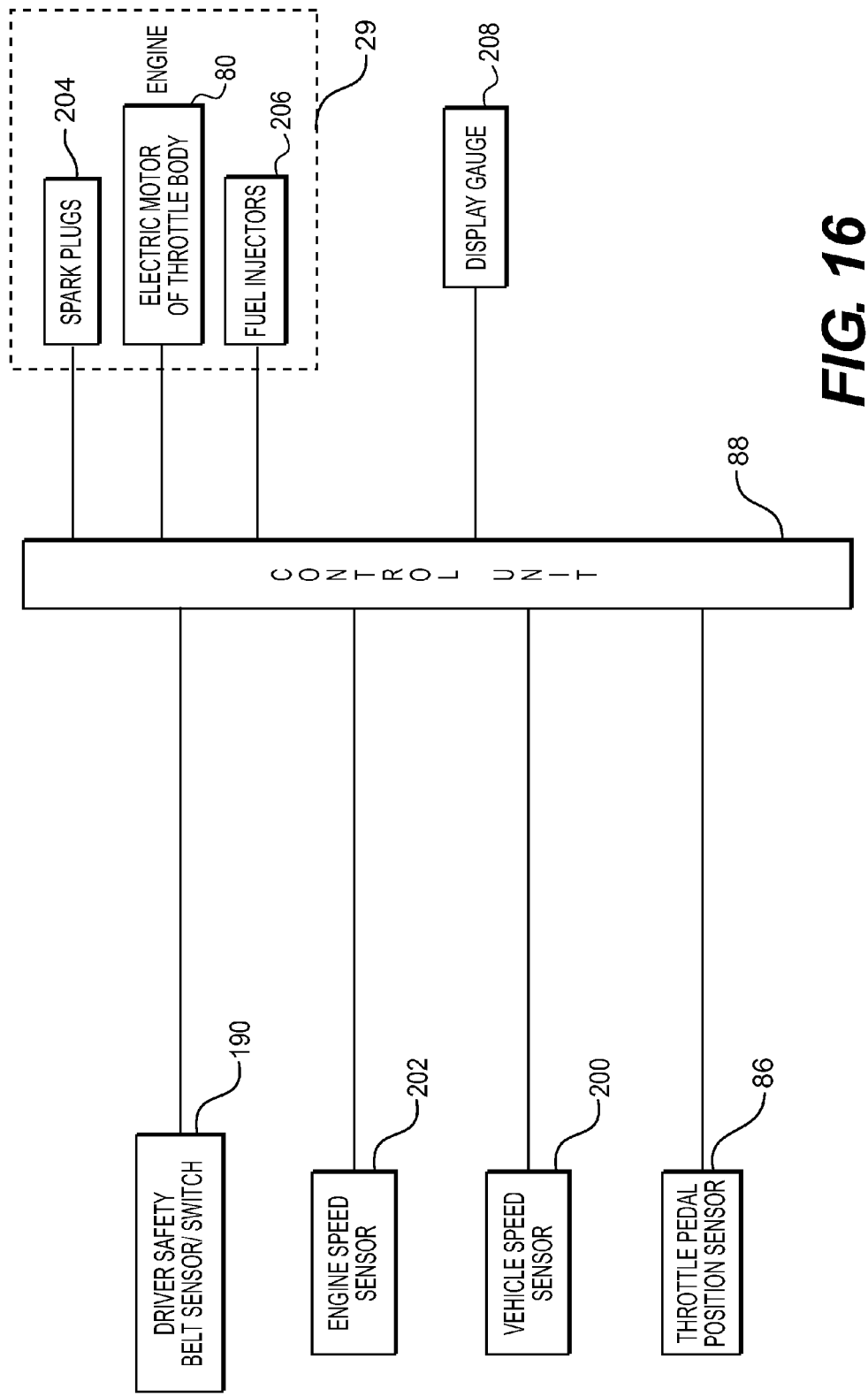
FIG. 16 is a schematic representation of elements of a control system of the RUV of FIG. 1.

As can be seen, the throttle body 68 is disposed forwardly and vertically higher than the engine 29. The throttle body 68 is also disposed forwardly and vertically higher than a front of the seat bases 17 of the seats 18. The throttle body 68 includes a throttle plate 78 (schematically shown in FIG. 12) that is positioned to regulate a flow of air to the element of the air induction system disposed downstream thereof and to the engine 29. An electric motor 80 is mounted to a right side of the throttle body 68 on a right side of the longitudinal centerline 76 of the vehicle 10 and laterally between the driver and passenger seats 18. The electric motor 80 is disposed inside the cooling tunnel defined by the console 23. The electric motor 80 is also disposed forwardly and vertically higher than the engine 29 and the front of the seat bases 17 of the seats 18. The electric motor 80 is operatively connected to the throttle plate 78 to pivot the throttle plate 78 inside the throttle body 68. The electric motor 80 positions the throttle plate 78 based at least in part on a position of a throttle pedal 82 (FIG. 11) of the vehicle 10. The throttle pedal 82 is located in front of the driver seat 18, above a floor of the cockpit area 22, below the steering device 16. The throttle pedal 82 is pivotally connected to a bracket 84. A throttle pedal position sensor 86 is mounted to the bracket 84 and is connected to a pivot shaft (not shown) of the throttle pedal 82 located forwardly of the throttle pedal 82. As such, the throttle pedal position sensor 86 is disposed forwardly of the electric motor 80. The throttle pedal position sensor 86 senses a position of the throttle pedal 82 and sends a throttle pedal position signal representative of this position to a control unit 88 (FIG. 16). Based at least in part on the throttle pedal position signal, the control unit 88 sends a signal to the electric motor 80 to adjust an opening of the throttle plate 78 of the throttle body 68.

The intake conduit 66 is generally ellipsoidal so as to act as a plenum chamber. As a result, the intake conduit 66 equalizes the pressure of the air being supplied to the engine 29 to account for the variations in air demand by the engine 29. The intake conduit 66 also acts as an acoustic silencer device to reduce the noise generated by the engine 29 that escapes from the air induction system. The intake manifold 64 separates the flow of air from the intake conduit 66 into two branches. Each of the branches of the intake manifold 64 is connected to an air intake port of a corresponding cylinder 60 of the engine 29.

Figure 9:
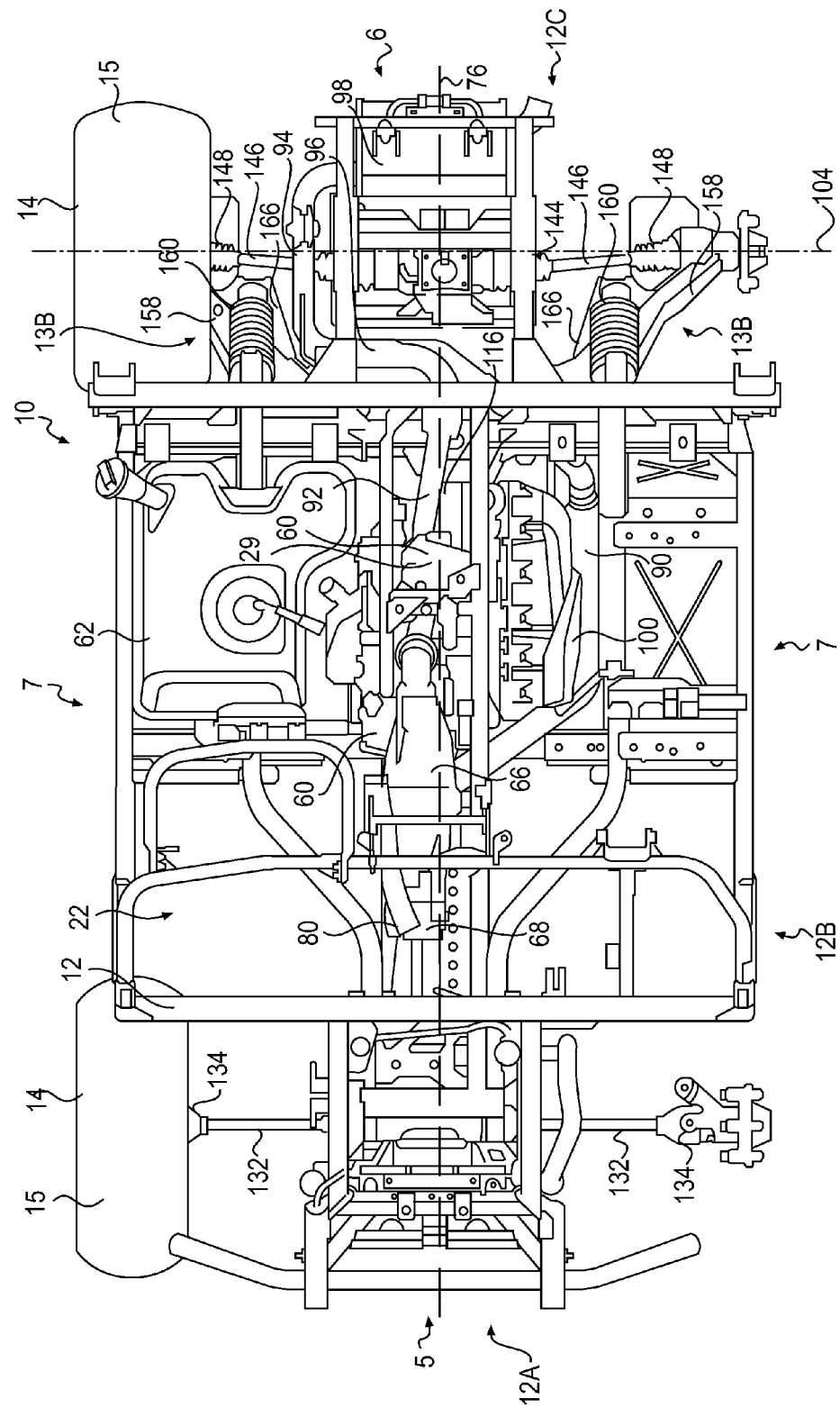
FIG. 9 is an alternative top plan view of some internal components of the RUV of FIG. 1.

An exhaust system, shown in FIG. 9, delivers the exhaust gases from the engine 29 to the atmosphere. The exhaust system includes exhaust pipes 90, 92, 94, an exhaust manifold 96, and a muffler 98. The exhaust pipe 90 is connected to an exhaust port of the front cylinder 60 of the engine 29 on a right side of the centerline 76. From this exhaust port, the exhaust pipe 90 extends to the left side of the centerline 76, extends longitudinally rearwardly under a cover 100 of a continuously variable transmission (CVT) 102 (FIG. 13), discussed in greater detail below, and connects to an inlet of the exhaust manifold 96 on a right side of the centerline 76. The exhaust pipe 92 is connected to an exhaust port of the rear cylinder 60 of the engine 29 on a right side of the centerline 76. From this exhaust port, the exhaust pipe 92 extends generally rearwardly and then bends toward the right to connect to another inlet of the exhaust manifold 96. The exhaust manifold 96 extends generally perpendicularly to the centerline 76 and extends away therefrom toward a right of the vehicle 10. The exhaust manifold 96 connects to the exhaust pipe 94. From the exhaust manifold 96, the exhaust pipe 94 extends generally parallel to the centerline 76 toward a rear of the vehicle 10 and then turns toward the centerline 76 to connect to the muffler 98. The muffler 90 extends generally perpendicularly to the centerline 76. The exhaust manifold 96 and the muffler 98 are disposed on opposite sides of an axis of rotation 104 of the rear wheels 14. When the engine 29 is operating, exhaust gases from the exhaust ports of the cylinders 60 flow consecutively through their respective exhaust pipes 90, 92, and the exhaust manifold 96 which combines the flows into a single flow in the exhaust pipe 94. From the exhaust pipe 94, the exhaust gases flow through the muffler 98 and are then released to the atmosphere.

Figure 11:
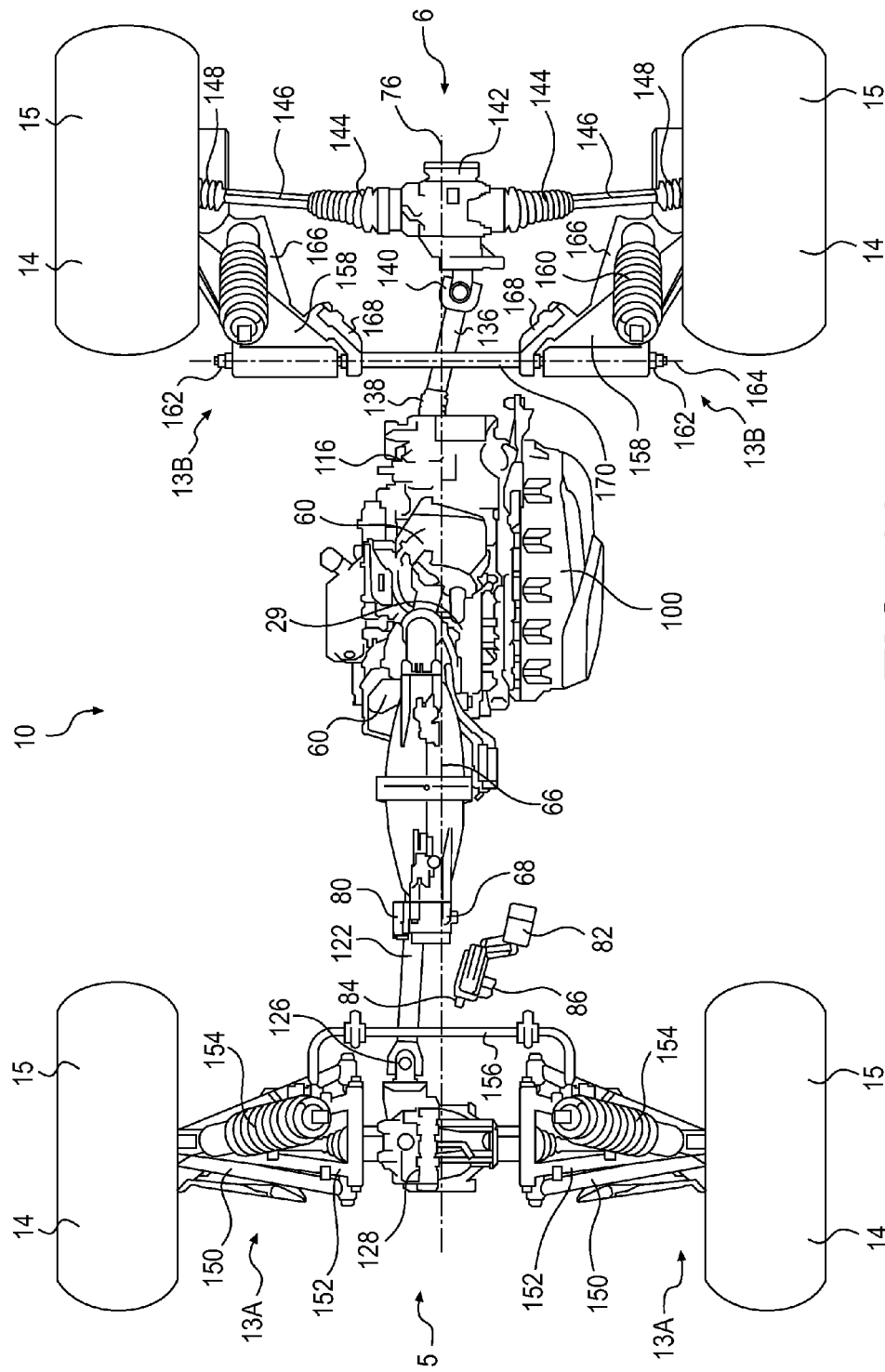
FIG. 11 is a top plan view of a power train and suspensions of the RUV of FIG. 1.
Figure 12:
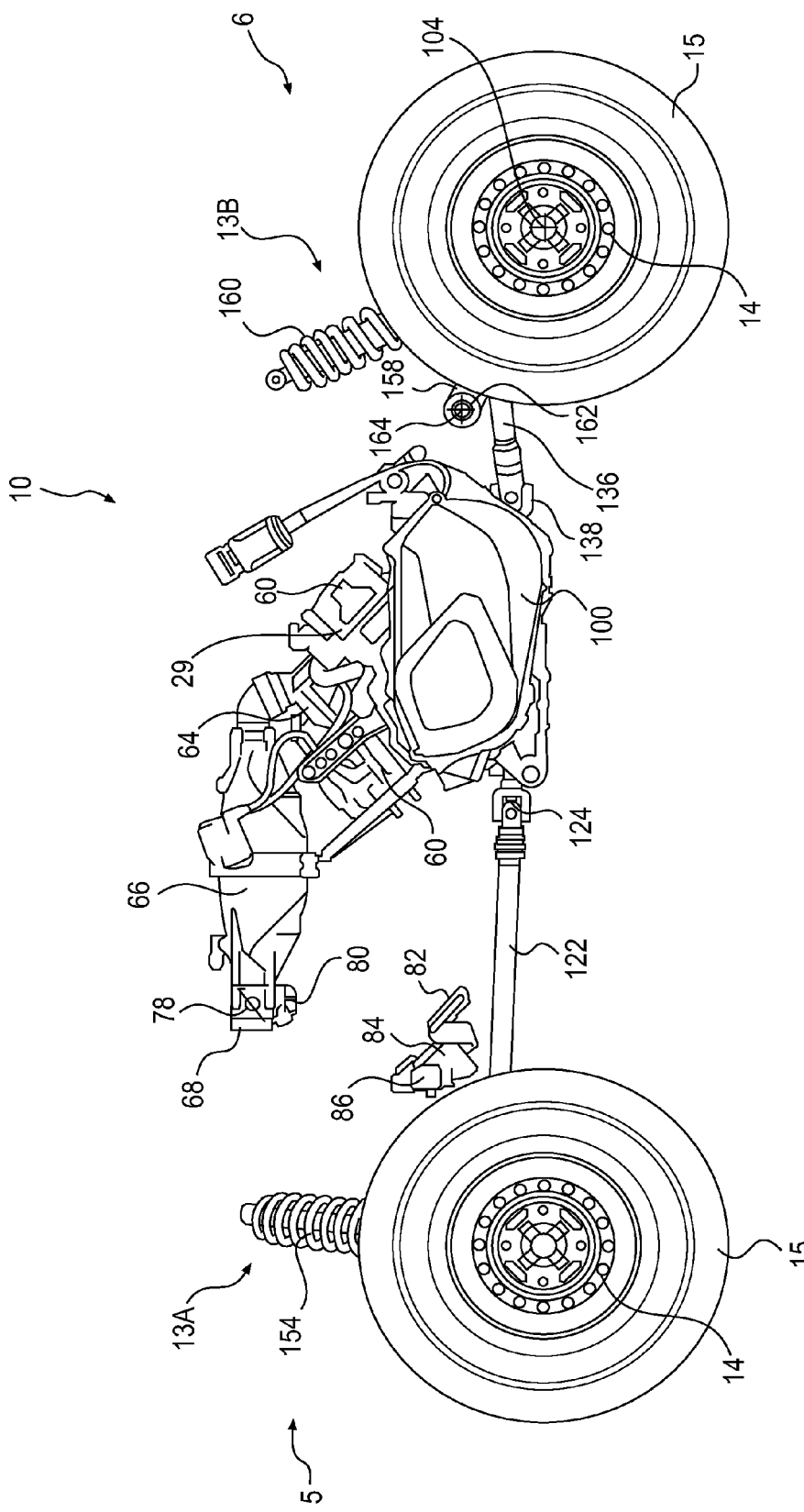
FIG. 12 is a left side elevation view of the power train and suspensions of FIG. 11.
Figure 13:
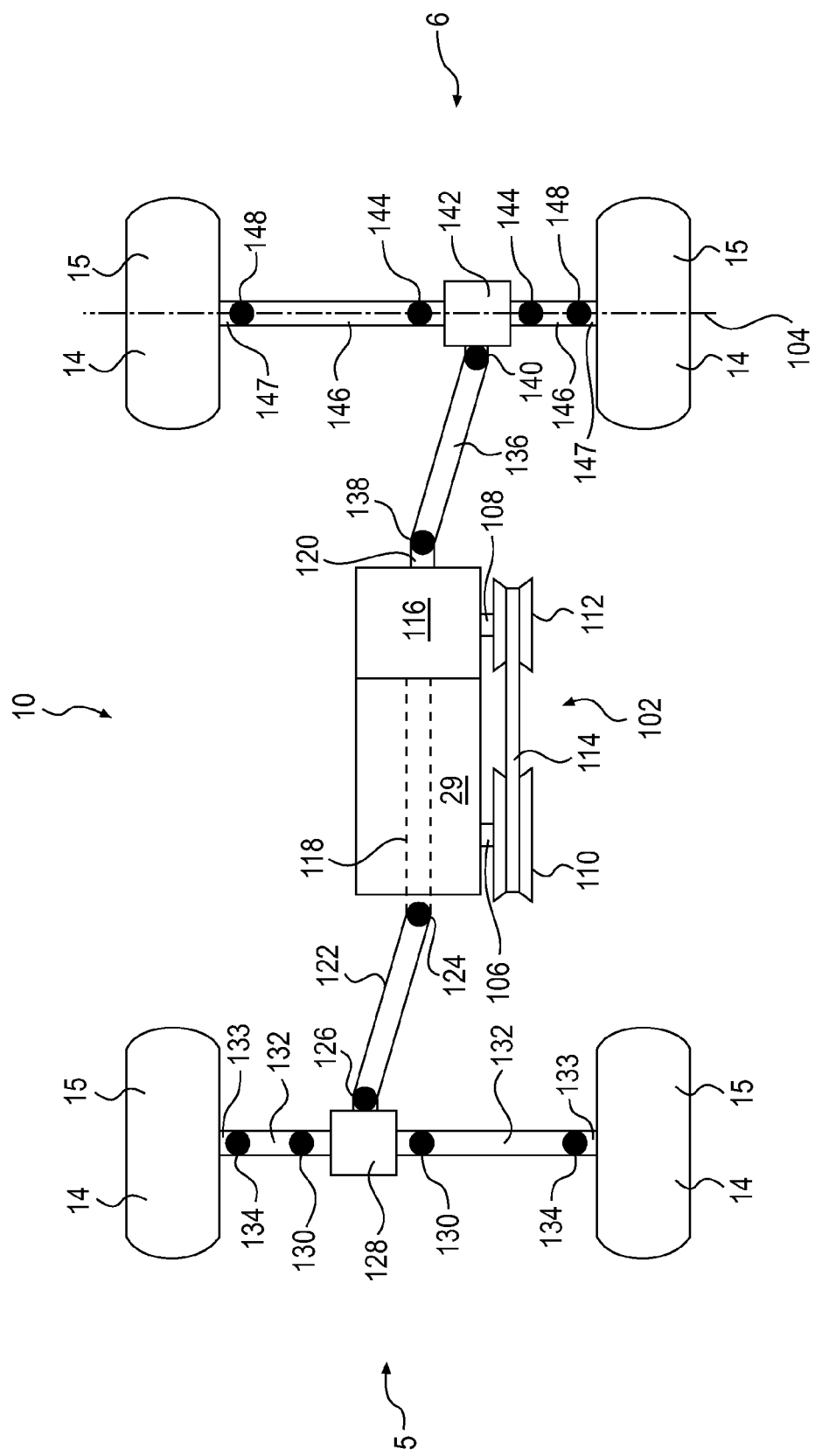
FIG. 13 is a schematic representation of the power train of FIG. 11.

With reference to FIGS. 11 to 13, the power train of the vehicle 10 will now be described. The engine 29 has a driving shaft 106 extending therefrom that is driven directly or via transmission means, such as gears, by a crankshaft of the engine 29. It is contemplated that the driving shaft 106 could be separate from the engine 29. The driving shaft 106 drives a driven shaft 108 via the CVT 102. The CVT is disposed on a left side of the longitudinal centerline 76. The CVT 102 includes a driving pulley 110 disposed on the driving shaft for rotation therewith, a driven pulley 112 disposed on the driven shaft 108 for rotation therewith, and a CVT belt 114 disposed around both pulleys 110, 112 to transmit the rotation of the driving pulley 110 to the driven pulley 112. Each one of the pulleys 110, 112 includes a beveled movable sheave that can move axially relative to a beveled fixed sheave in response to changes in rotational speed and torque to modify an effective diameter of the corresponding pulley 110, 112 thereby modifying a transmission ratio from the driving pulley 110 to the driven pulley 112. The driven shaft 108 drives a transmission 116. The transmission 116 is connected to the back of the engine 29. The cover 100 is disposed over the CVT 102 and is connected to both the engine 29 and the transmission 116. The transmission 116 transfers the torque from the driven shaft 108, which extends transversely to the longitudinal centerline 76, to front and rear driveshaft 118, 120, which extend parallel to the centerline 76. It is contemplated that the transmission 116 could also vary the speed of rotation from the driven shaft 108 to the driveshaft's 118, 120.

The front driveshaft 118 passes through the engine 29 and connects to a secondary front driveshaft 122 via a universal joint 124. From the universal joint 124, the secondary front driveshaft 122 extends forwardly and toward the right of the vehicle 10 to another universal joint 126. The universal joint 126 connects the secondary front driveshaft 122 to a differential 128. The differential 128 connects, via universal joints 130, to left and right drive axles 132. The drive axles 132 are connected to spindles 133 of the front wheels 14 via universal joints 134.

The rear driveshaft 120 connects to a secondary rear driveshaft 136 via a universal joint 138. From the universal joint 138, the secondary front driveshaft 136 extends rearwardly and toward the left of the vehicle 10 to another universal joint 140. The universal joint 140 connects the secondary front driveshaft 136 to a differential 142. The differential 142 connects, via universal joints 144, to left and right drive axles 146. The drive axles 146 are connected to spindles 147 the rear wheels 14 via universal joints 148.

With reference to FIGS. 11 and 12, the front and rear suspensions 13A, 13B will now be described. The left suspensions 13A, 13B being identical to the right suspensions 13A, 13B, only the left suspensions 13A, 13B will be described below. Accordingly, identical elements are labeled with the same reference numerals in the figures. It is contemplated that at least some of the elements of the right suspensions 13A, 13B may be different from their corresponding elements of the left suspensions 13A, 13B. For example, suspension elements on one side may differ from suspension elements on the other side to accommodate elements of the vehicle 10 that are present on only one side or that differ between each side.

The front left suspension 13A includes lower and upper A-arms 150, 152. The lower A-arm 150 is pivotally connected at one end to the front portion 12A of the frame 12 and pivotally connected to a lower portion of a kingpin (not shown) at the other end. The front left wheel 14 is rotationally connected to the kingpin. The upper A-arm 152 is disposed above the lower A-arm 150. The upper A-arm 152 is pivotally connected at one end to the front portion 12A of the frame 12 and pivotally connected to an upper portion of the kingpin at the other end. A shock absorber 154 is connected between the outer end of the upper A-arm 152 and the front portion 12A of the frame 12.

A sway bar 156, disposed rearwardly of the front suspensions 13A, is connected to both upper A-arms 152 to increase the roll stiffness of the suspensions 13A.

Figure 10:
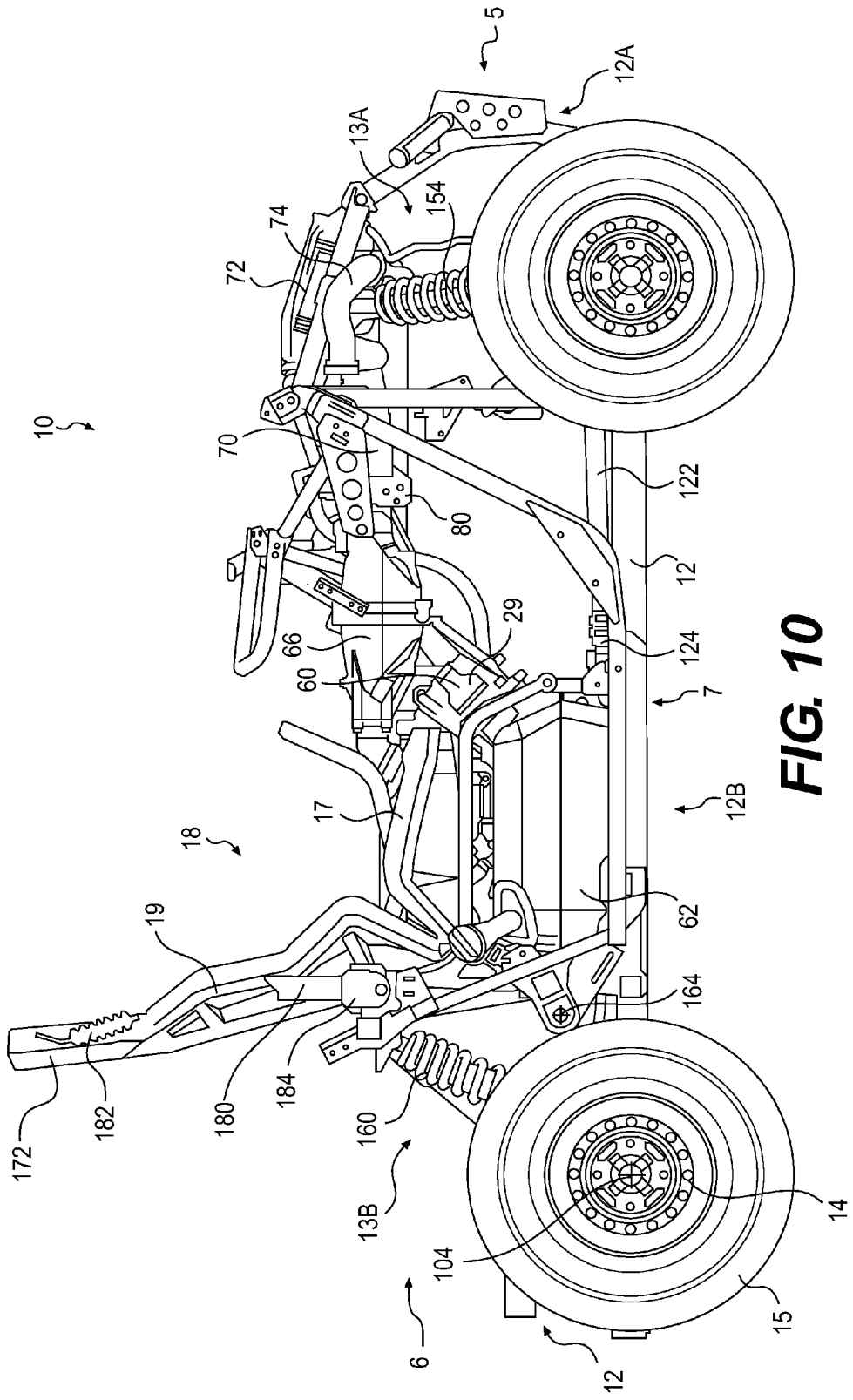
FIG. 10 is a right side elevation view of some internal components of the RUV of FIG. 1.

The rear left suspension 13B includes a swing arm 158 and a shock absorber 160. A tubular front end of the swing arm 158 is inserted over a shaft 162 defining a pivot axis 164 of the swing arm 158. As can be seen in FIG. 10, the pivot axis 164 is disposed rearwardly of the fuel tank 62 and of the rearmost point of the seat base 17 and is disposed forwardly of the rearmost point of the backrest 19. From its front end, the swing arm 158 extends outwardly and rearwardly to its tubular rear end inside which the spindle 147 of the rear left wheel 14 is received. The swing arm 158 has a plate 166 integrally formed therewith that extends rearwardly from a central portion of the swing arm 158. A lower end of the shock absorber 160 is connected to the plate 166. From the plate 166, the shock absorber 160 extends upwardly and forwardly to connect to the frame 12. A link 168 fixedly connects the swing arm 158 to a left end of a torsion bar 170. The torsion bar 170 is co-axial with the shaft 162. Since the other end of the torsion bar 170 is fixedly connected to the link 168 of the rear right suspension 13B, the torsion bar 170 increases the roll stiffness of the suspensions 13B.

Figure 14:
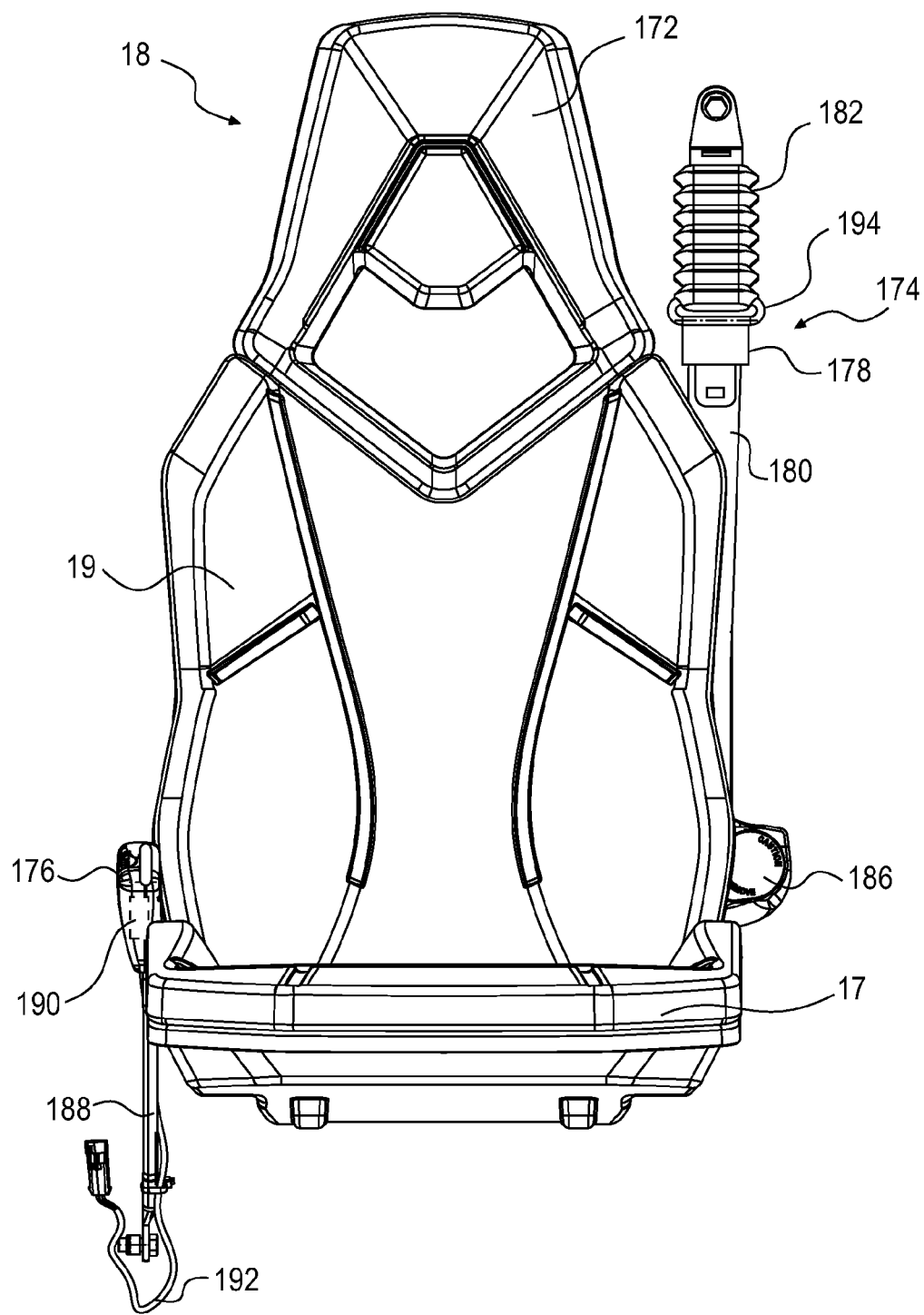
FIG. 14 is a front elevation view of a driver seat of the RUV of FIG. 1, with the safety belt being disconnected.
Figure 15:
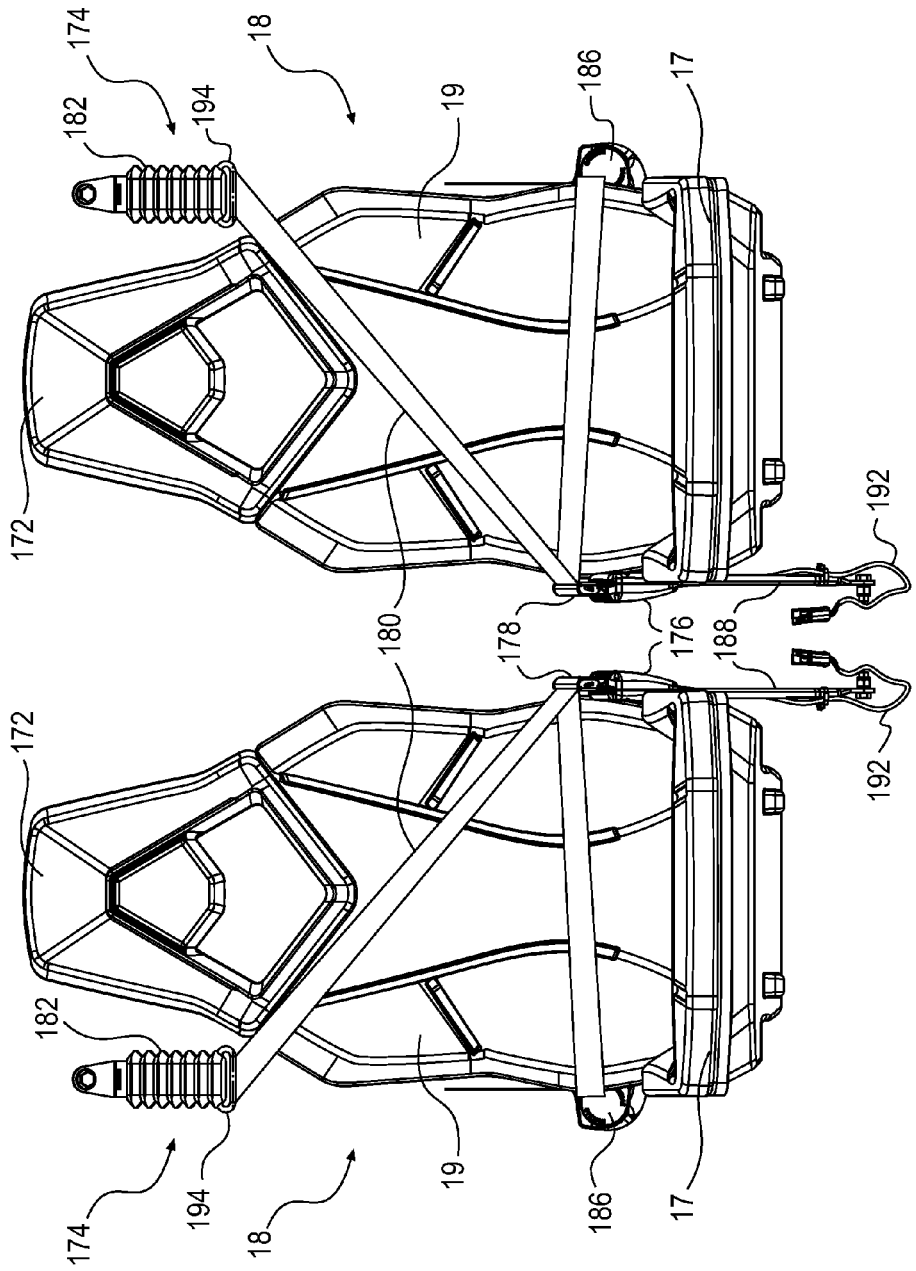
FIG. 15 is a front elevation view of the seats of the RUV of FIG. 1, with the safety belts being connected.

Turning now to FIGS. 14 and 15, the driver and passenger seats 18 and their safety belts 174 will be described. Except where noted below, the passenger seat 18 and the passenger safety belt 174 are mirror images of the driver seat 18 and the driver safety belt 174. Therefore, only the driver seat 18 and the driver safety belt 174 will be described in detail. Accordingly, identical elements are labeled with the same reference numerals in the figures. It is contemplated that the two seats 18 and the two safety belts 174 could be different from each other.

Both the seat base 17 and the backrest 19 are contoured to comfortably receive the driver and provide him with lateral support. The seat base 17 and the backrest 19 include a metallic frame and are made of a plastic and/or hard foam base covered with a softer foam and upholstered with leather for waterproofing. It is contemplated that the seat base 17 and the backrest 19 could be made of other materials and have a different structure. The backrest 19 includes a headrest 172 integrally formed therewith.

The seat 18 is provided with a three-point safety belt 174. It is contemplated that the safety belt 174 could be a different type of safety belt, such as a five-point, six-point, or seven-point harness. The safety belt 174 includes two selectively connectable portions in the form of a latching clasp 176 and a belt buckle 178, a seat belt 180, an upper anchoring member 182 connected to the roll cage 30, a lower anchoring member 184 (FIG. 10), and a retractor mechanism 186 connected to the frame 12. It is contemplated that the selectively connectable portions could be elements other than the latching clasp 176 and the belt buckle 178. The belt buckle 178 is secured to the seat belt 180. The latching clasp 176 is connected to the frame 12 by a metal rod 188. It is contemplated that the belt buckle 178 could be connected to the frame 12 with the latching clasp 176 secured to the seat belt 180. A safety belt switch 190 (schematically shown in FIG. 14) is disposed inside the latching clasp 176. The switch 190 has a lever that is pushed by the belt buckle 178 when it is inserted in the latching clasp 176. As a result, the switch 190 closes a safety belt circuit, which sends a safety belt signal to the control unit 88 via a wire 192 indicative that the belt buckle 178 is connected to the latching clasp 176 and that the safety belt 174 is fastened as in FIG. 15. When the belt buckle 178 is not inserted in the latching clasp 176, the safety belt circuit is opened, and the safety belt signal to the control unit 88 (i.e. the lack of a signal from the safety belt circuit) indicates that the safety belt 174 is unfastened as in FIG. 14. It is contemplated that the safety belt switch 190 could be provided on the belt buckle 178. It is also contemplated that the safety belt switch 190 could be replaced with a safety belt sensor in the latching clasp 176 or the belt buckle 178 or having one portion in the latching clasp 176 and another portion in the belt buckle 178. The passenger seat 18 is not provided with a safety belt switch 190. The seat belt 180 is looped through a ring 194 connected to the upper anchor 182. One end of the seat belt 180 is connected to the lower anchoring member 184. The other end of the seat belt 180 is connected to the retractor mechanism 186. The retractor mechanism 186 winds the seat belt 180 about a spool (not shown) when the safety belt 174 is unfastened to retract the seat belt 180. The retractor mechanism 186 permits the seat belt 180 to be unwound from the spool when fastening the safety belt 174, but includes a locking mechanism that stops the spool from rotating in the event of a collision of the vehicle 10.

Figure 4:
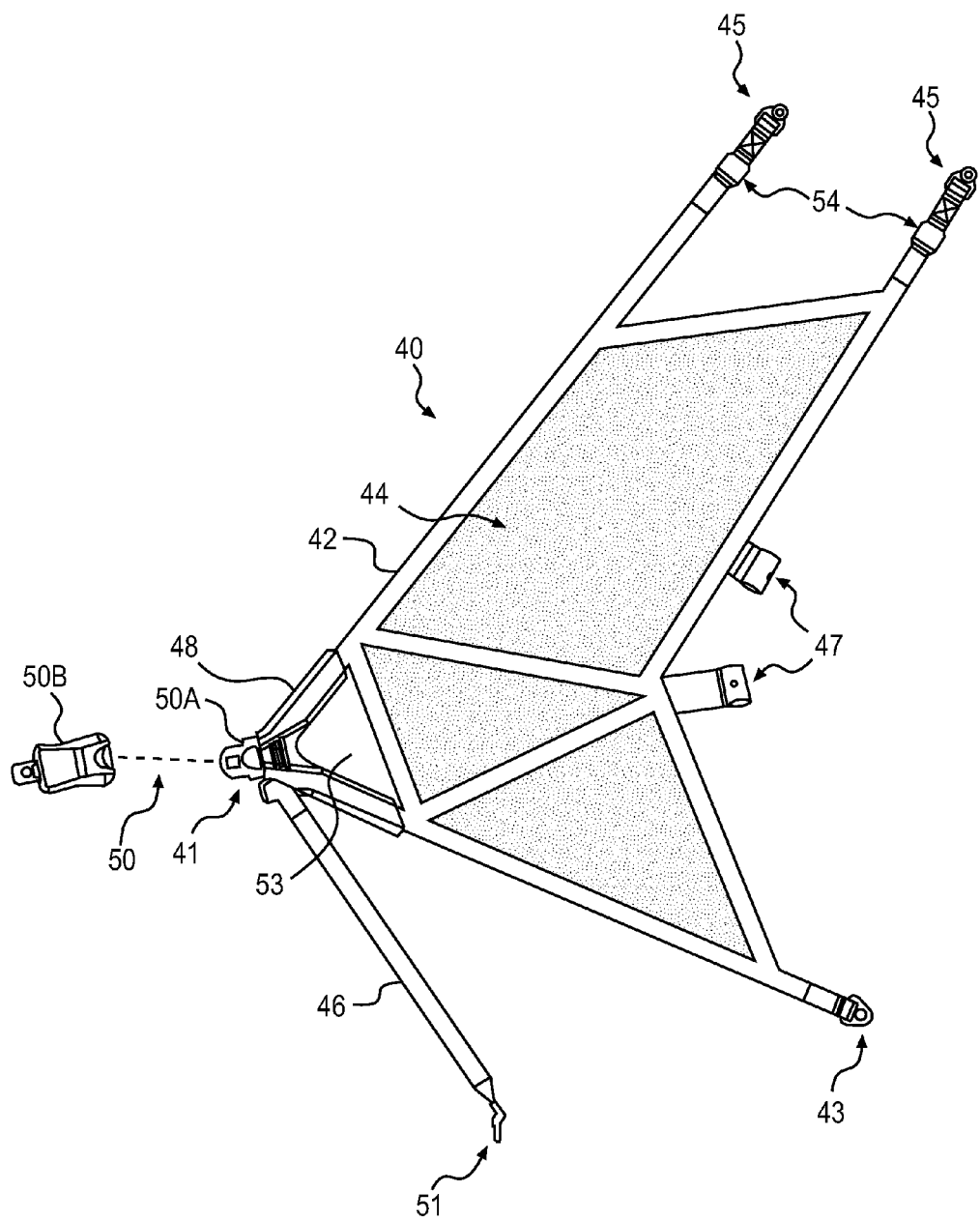
FIG. 4 is a left side elevation view of a left lateral cover for the RUV of FIG. 1.

Turning back to FIG. 4, the left lateral cover 40 will be described in greater detail. The right lateral cover 40 being a mirror image of the left lateral cover 40, it will not be described in detail herein.

The lateral cover 40 has a general triangular shaped body. The lateral cover 40 connects to the roll cage 30 via two upper attachment points 45 and to the frame 12 via a lower attachment point 43. The lateral cover 40 selectively connects to the frame 12 via a forward attachment point 41. The lateral cover 40 extends forwardly and downwardly from the upper attachment points 45 to the forward attachment point 41, and extends forwardly and upwardly from the lower attachment point 43 to the forward attachment point 41. One of the upper attachment points 45 is located longitudinally between the lower attachment point 43 and the forward attachment point 41. It is contemplated that the lateral cover 40 could be connected to the roll cage 30 at one or more than three attachment points 45. It is contemplated that two or more lower attachment points 43 could be used. It is contemplated that the two upper attachment points 45 could be located longitudinally between the lower attachment point 43 and the forward attachment point 41. It is also contemplated that the lower attachment point 43 could be located longitudinally between the two upper attachment points 45 and the forward attachment point 41.

Two additional attachment points 47 connect the lateral cover 40 to the lateral restraining member 36. It is contemplated that only one or more or no additional attachment points 47 could be used to secure the lateral cover 40 to the RUV 10. It is also contemplated that the additional attachment points 47 could connect to the roll cage 30 itself.

The lateral cover 40 is mounted to the RUV 10 via strap holders that are fixed to the roll cage 30 via nuts and bolts at the attachment points 43 and 45, and via tubes formed in the straps at the additional attachment points 47. It is contemplated that the lateral cover 40 could be mounted to the RUV 10 by other means.

The lateral cover 40 is selectively disposed across the lateral passage 24 via the forward attachment point 41. A releasable connector 50 at the forward attachment point 41 is used to selectively close the lateral cover 40. The connector 50 has a female connection portion, in the form of a latching clasp 50B, connected to the frame 12, and a male connection portion, in the form of a belt buckle 50A, connected to the lateral cover 40. To open and close the lateral cover 40, as it will be described in greater details below, the rider selectively engages the belt buckle 50A into the latching clasp 50B by inserting his fingers into an aperture 53 and securing them around a semi-rigid sleeve 48. It is contemplated that the latching clasp 50B and the belt buckle 50A could be replaced by another type of connector 50. It is contemplated that the belt buckle 50A could be connected to the frame 12 with the latching clasp 50B secured to the lateral cover 40. The semi-rigid sleeve 48 is disposed around a portion of the flexible straps 42. The semi-rigid sleeve 48 is a plastic sleeve that gives some rigidity to the corner area around the aperture 53 for ease of handling during opening and closing of the lateral cover 40. It is contemplated that the sleeve 48 could be completely rigid. It is also contemplated that the semi-rigid sleeve 48 could be flexible. It is contemplated that the semi-rigid sleeve 48 could be made of a material other than plastic. It is also contemplated that the semi-rigid sleeve 48 could be omitted.

Figure 5:
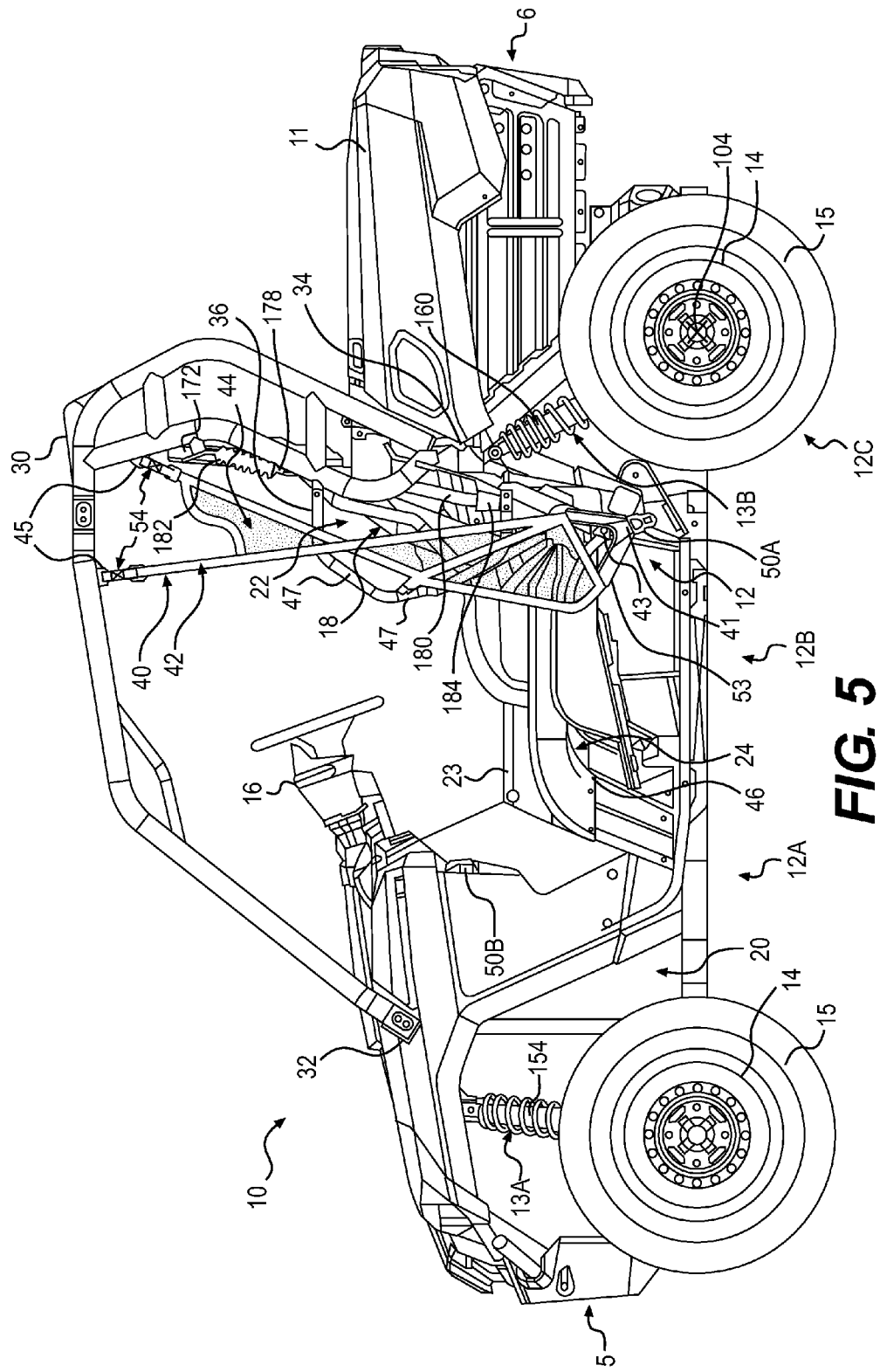
FIG. 5 is a left side elevation view of the RUV of FIG. 1 with the lateral cover in an open position.
Figure 6:
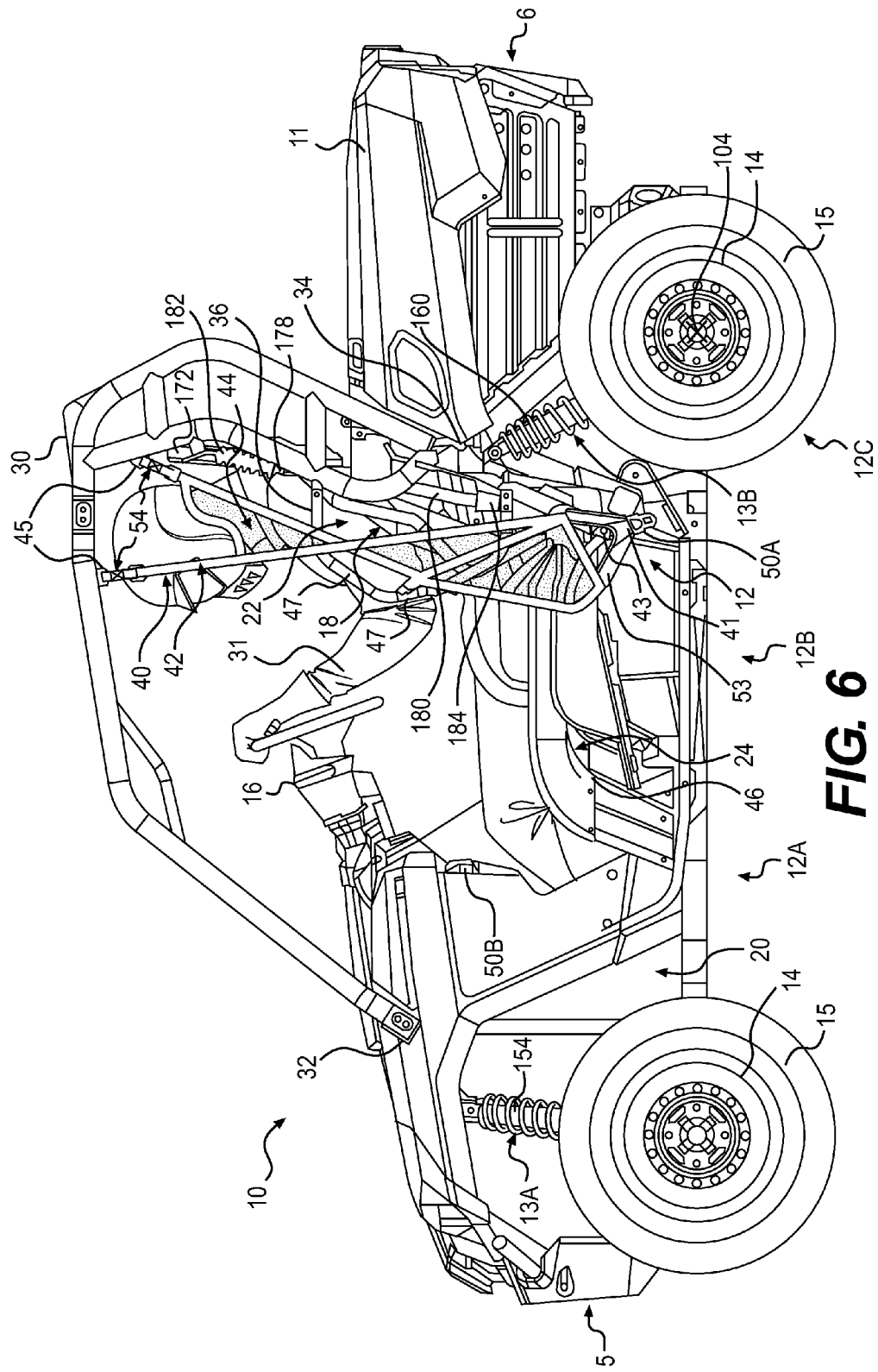
FIG. 6 is a left side elevation view of the RUV of FIG. 5 with a rider seated therein.

The generally triangular shaped body of the lateral cover 40 is made of a plurality of flexible straps 42 and flexible panels 44 of mesh material (schematically illustrated with stippled shading in FIGS. 1 to 2 and 4 to 7). The flexible straps 42 are polyester straps dimensioned so that the lateral cover 40 is disposed tight across the lateral passage 24. The flexible straps 42 are flexible enough to move freely downwards by gravity when the lateral cover 40 is not disposed across the lateral passage 24 (as shown in FIGS. 5 and 6). The polyester material of the flexible straps 42 does not stretch considerably. Some of the flexible straps 42 are provided with stretchable portions. It is contemplated that the flexible straps 42 could be made of a different material. The upper flexible straps each include a strap adjuster 54. The strap adjusters 54 allow to adjust a length of the upper flexible straps 42, and therefore to adjust a tension of the flexible straps 42. It is contemplated that the strap adjusters 54 could be omitted.

A flexible strap 46, separate from the lateral cover 40, connects the lateral cover 40 to an attachment point 51. The flexible strap 46 is a strap that provides an additional retention means for the feet of the riders. The flexible strap 46 extends from the forward attachment point 41 to the attachment point 51. The attachment point 51 is located longitudinally forward of the lower attachment point 43 and longitudinally rearward of the forward attachment point 41. It is contemplated that the flexible strap 46 could be omitted. It is also contemplated that the flexible strap 46 could be part of the lateral cover 40 and be connected to the lateral cover 40 by a flexible panel 44.

The arrangement of the plurality of flexible straps 42 defines areas where the flexible panels 44 are disposed. There are three flexible panels 44. It is contemplated that more or less than three flexible panels 44 could be used. It is also contemplated that the flexible straps 42 could define only zones where a flexible panel should be disposed thereon, and that the flexible panel 44 would be a single flexible panel covering the zones defined by the flexible straps 42.

The flexible panels 44 are made of 200 denier nylon. The flexible panels 44 are dimensioned so that the lateral cover 40 is disposed tight across the lateral passage 24. The flexible panels 44 are made of a meshed material that allows the driver and the passenger to see through it and let wind blow through.

Figure 7:
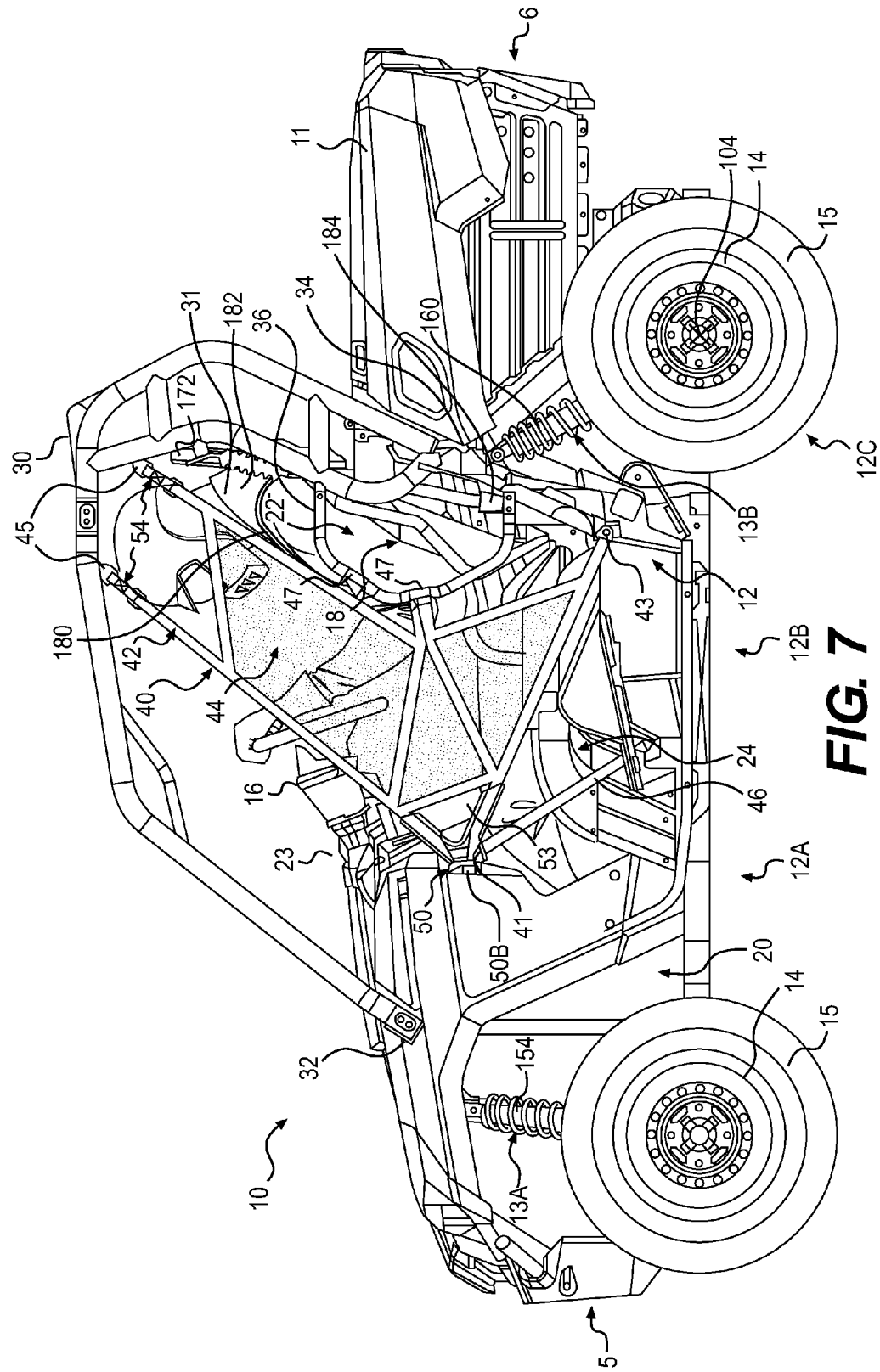
FIG. 7 is a left side elevation view of the RUV of FIG. 6 with the lateral cover in a closed position.

Referring now to FIGS. 5 to 7, a mode of operation of the lateral cover 40 will be described.

The rider desiring to ingress the RUV 10 opens the lateral cover 40, if not already done. To do so, the rider disconnects the lateral cover 40 at the forward attachment point 41 from the vehicle 10, by detaching the belt buckle 50A from the latching clasp 50B of the connector 50. More specifically, the rider positions one or more fingers through the aperture 53 to reach the belt buckle 50A. The rider presses a button on the latching clasp 50B to release the belt buckle 50A from the latching clasp 50B. The rider removes his fingers from the aperture 53 and the belt buckle 50A swings backwards. As a result, the lateral cover 40, moves into a compact position that clears up the lateral passage 24 as shown in FIG. 5.

Once the lateral cover 40 is out of the way of the lateral passage 24, the rider ingresses the cockpit area 22 and sits on the seat 18, as shown in FIG. 6. Before riding the RUV 10, the rider closes the lateral cover 40. To do so, the rider grabs the semi-rigid sleeve 48 via the aperture 53 and inserts the belt buckle 50A in the latching clasp 50B. This extends and secures the lateral cover 40 across the lateral passage 24 as illustrated in FIG. 7. Once the cover 40 is secured, the rider fastens his safety belt 174.

To exit the RUV 10, the rider unfastens his safety belt 174 and disconnects the lateral cover 40 from the vehicle 10 at the forward attachment point 41. To disconnect the lateral cover 40, the rider grabs the connector 50, puts his fingers through the aperture 53, and presses the button of the latching clasp 50B to detach the belt buckle 50A from the latching clasp 50B. The lateral cover 40 swings downwards and rearwards due to the weight of the buckle 50A and the semi-rigid sleeve 48, thereby freeing the lateral passage 24. The rider egresses the cockpit area 22 through the lateral passage 24.

Turning now to FIG. 16, elements of a control system of the RUV 10 will be described. The sensors/switches 86 and 190 have already been described above and will therefore not be described again below.

The RUV 10 has a vehicle speed sensor 200. The vehicle speed sensor 200 senses a speed of rotation of the driven shaft 108. The vehicle speed sensor 200 transmits a vehicle speed signal based on the speed of rotation of the driven shaft 108 to the control unit 88. By knowing the diameter of the wheels 14 and, if applicable, a transfer ratio of the transmission 116, the control unit can determine a speed of the vehicle 10. It is contemplated that the vehicle speed sensor 200 could sense a speed of any shaft driven by the driven pulley 112 (i.e. any shaft connected between the driven pulley 112 and one of the wheels 14), including shafts inside the transmission 116, to determine the speed of the vehicle 10.

The RUV 10 also has an engine speed sensor 202. The engine speed sensor 202 senses engine speed of the engine 29 by sensing the speed of rotation of a rotating shaft of the engine 29, such as the crankshaft or camshaft (not shown), or of the driving shaft 106. The engine speed sensor 202 transmits an engine speed signal based on this speed of rotation to the control unit 88.

Based at least in part on the signals received from the switches/sensors 86, 190, 200 and 202, the control unit 88 controls an operation of the engine 29. To control the operation of the engine 29, the control unit 88 sends a signal to the electric motor 80 to control a position of the throttle plate 78 in the throttle body 68, sends another signal to the spark plugs 204 to control ignition timing, and sends another signal to the fuel injectors 206 to control fuel injection.

Also based on the signals received from the switches/sensors 190, 200 and 202, the control unit 88 controls a display of information on one or more display gauges 208 disposed in front of the driver seat 18 above the steering device 16. From the signals from the sensors 200, 202, the gauges 208 display engine and vehicle speed. From the signal from the switch/sensor 190 the gauges 208 displays an icon or message when the driver safety belt 174 is not fastened. It is contemplated that not all of the above could be displayed on the gauges 208.

It is contemplated that the control unit 88 could be separated into multiple units each having one or more of the functions described above and further below.

The RUV 10 has other features and components such as headlights and handles. As it is believed that these features and components would be readily recognized by one of ordinary skill in the art, further explanation and description of these components will not be provided herein.

Figure 17:
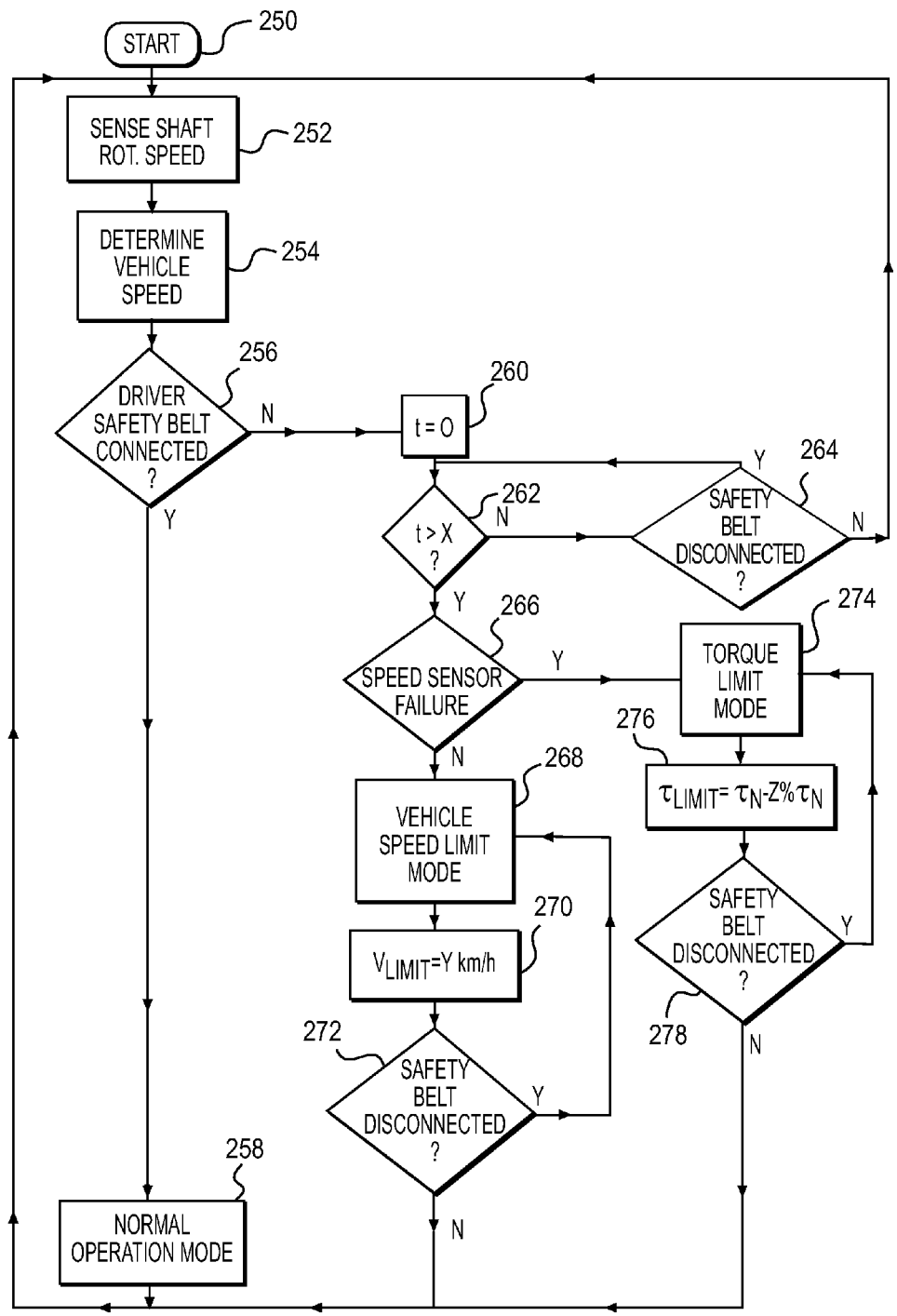
FIG. 17 is a logic diagram illustrating a method of controlling a speed of the RUV of FIG. 1.

As discussed above, although the vehicle manufacturers and other organizations may mandate and/or encourage drivers to use of their safety belt 174, some drivers nonetheless do not make use of it. Therefore the following method, described with reference to FIG. 17, limits a speed of the vehicle 10 using the above described system when the driver safety belt 174 is disconnected.

The method is initiated at step 250 when the engine 29 is operating. At step 252, the vehicle speed sensor 200 sense the speed of rotation of its associated shaft. At step 254, the control unit 88 determines the speed of the vehicle 10 based on the vehicle speed signal received from the vehicle speed sensor 200.

At step 256, the control unit 88 determines from the safety belt signal received from the safety belt sensor/switch 190 if the driver safety belt 174 is connected. If at step 256, the driver safety belt 174 is connected the method proceeds to step 258 and operates the engine 29 in a normal operation mode. From step 258, the method returns to step 252. If at step 256, the driver safety belt 174 is determined to be disconnected, the control unit 88 initiates a timer (t=0) at step 260. Then at step 262, the control unit 88 determines if a predetermined period of time X has elapsed since the initiation of the timer at step 260. If the predetermined period of time X has not yet elapsed, the method proceeds to step 264 where the control unit 88 determines from the safety belt signal received from the safety belt sensor/switch 190 if the driver safety belt 174 is still disconnected. If it is, the method returns to step 262. If at step 264 it is determined that the driver safety belt 174 is now connected, the method returns to step 252. As would be understood, steps 262 and 264 are repeated until the predetermined period of time X has elapsed or the driver safety belt 174 is connected. In an exemplary embodiment, the predetermined period of time X is 5 seconds.

If at step 262, the predetermined period of time X has elapsed, the method then proceeds to step 266. At step 266, the control unit 88 determines if the vehicle speed sensor 200 has failed. The control unit 88 can determine if the vehicle speed sensor has failed due to, for example, a lack of signal from the vehicle speed sensor 200, an intermittent signal from the vehicle speed sensor 200, or readings from the vehicle speed sensor 200 which is are inconsistent with other parameters of the vehicle 10. If at step 266 it is determined that the vehicle speed sensor 200 operates properly, the method proceeds to step 268. At step 268, the control unit 88 controls the engine 29 in a vehicle speed limit mode. In the vehicle speed limit mode, at step 270, the control unit 88 limits the speed of the vehicle 10 to a predetermined speed of Y km/h which is less than a maximum speed of the vehicle 10. In an exemplary embodiment, the predetermined speed of Y km/h is less than one third of the maximum speed of the vehicle 10. For example, it is contemplated that the predetermined speed of the vehicle 10 could be 20 km/h for a vehicle 10 having a maximum speed of 70 km/h. While in the vehicle speed limit mode, the control unit 88 control the spark plugs 204, the electric motor 80 and/or the fuel injectors 206 such that the vehicle 10 does not exceed the predetermined vehicle speed of Y km/h even though the throttle pedal position signal from the throttle pedal position sensor 86 is indicative of a higher desired vehicle speed. It should be noted that, although the control unit 88 controls the engine 29 so as not to exceed the predetermined speed of Y km/h while in the vehicle speed limit mode, the control unit 88 controls the engine 29 such that the engine 29 provides a torque necessary to obtain the desired vehicle speed up to the predetermined speed of Y km/h. For example, should the vehicle 10 operate in the vehicle speed limit mode at the predetermined vehicle speed of Y km/h while on level ground, the control unit 88 will increase the torque generated by the engine 29 should the vehicle 10 start going up a hill in order to maintain the predetermined vehicle speed of Y km/h should the driver wan to continue to operate the vehicle 10 at that speed. From step 270, the method proceeds to step 272 where the control unit 88 determines from the safety belt signal received from the safety belt sensor/switch 190 if the driver safety belt 174 is still disconnected. If it is, the method returns to step 268 and the control unit 88 continues to control the engine 29 in the vehicle speed limit mode. If at step 272 it is determined that the driver safety belt 174 is now connected, the method returns to step 252.

If at step 266, the control unit determines that the vehicle speed sensor 200 has failed, the method proceeds to step 274. At step 274, the control unit 88 controls then engine in a torque limit mode. In the torque limit mode, at step 276 the control unit 88 limits the torque that can be generated by the engine 29 by controlling the spark plugs 204, the electric motor 80 and/or the fuel injectors 206 such that the engine 29 does not exceed a predetermined torque which is less than a maximum torque of the engine. By limiting the torque that can be generated by the engine 29, the control unit 88 indirectly limits the speed that the vehicle 10 can reach compared to the speed possible during the normal operation mode. At step 276, the predetermined torque to which the engine 29 is limited ($\tau_{Limit}$) is set to correspond to a torque that would be generated by the engine 29 outside of the torque limit mode under the current operating condition ($\tau_N$), as determined from signals from the sensors 86 and 202 for example, reduced by a percentage Z % thereof. In an exemplary embodiment, the value of the percentage Z % reduces as the engine speed, as sensed by the engine speed sensor 202, increases. For example, it is contemplated that at 1700 RPM, $\tau_N$ is reduced by 53%; at 2200 RPM, $\tau_N$ is reduced by 43%; and at 2800 RPM, $\tau_N$ is reduced by 33%. From step 276, the method proceeds to step 278 where the control unit 88 determines from the safety belt signal received from the safety belt sensor/switch 190 if the driver safety belt 174 is still disconnected. If it is, the method returns to step 274 and the control unit 88 continues to control the engine 29 in the torque limit mode. If at step 278 it is determined that the driver safety belt 174 is now connected, the method returns to step 252.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

What is claimed is:

1. An off-road vehicle comprising:
   a frame;
   a cockpit area defined in the frame;
   a roll cage connected to the frame, the roll cage covering at least in part the cockpit area;
   a driver seat and a passenger seat disposed side-by-side in the cockpit area, the seats being covered by the roll cage;
   two lateral sides, the cockpit area being disposed between the two lateral sides, each of the two lateral sides comprising a lateral passage disposed near at least in part forward of a corresponding one of the two seats, the lateral passages being adapted to allow ingress and egress from the cockpit area;
   an engine supported by the frame;
   two front wheels and two rear wheels supported by the frame, at least two of the wheels being operatively connected to the engine for propelling the vehicle;
   a steering device disposed at least in part forward of the two seats, the steering device being operatively connected to at least two of the wheels for steering the vehicle;
   a control unit connected to the engine for controlling an operation of the engine;
   a throttle pedal disposed forwardly of the driver seat below the steering device;
   a throttle pedal position sensor sensing a position of the throttle pedal, the throttle pedal position sensor being connected to the control unit for sending a throttle pedal position signal representative of the sensed throttle pedal position to the control unit;
   an air intake conduit fluidly connected to an air intake port of the engine;
   a throttle body fluidly connected to the air intake conduit, the throttle body including a valve, a position of the valve regulating a flow of air to the air intake conduit; and
   an electric motor operatively connected to the valve for positioning the valve in the throttle body, the electric motor being connected to the control unit, the control unit controlling an operation of the electric motor based at least in part on the throttle pedal position signal, the electric motor being disposed rearwardly of the throttle pedal position sensor and forwardly of a front of the engine.

2. The vehicle of claim 1, wherein the electric motor is vertically higher than the engine.

3. The vehicle of claim 1, wherein the electric motor is vertically higher than a front of the driver and passenger seats.

4. The vehicle of claim 1, wherein the electric motor is disposed forwardly of the driver and passenger seats.

5. The vehicle of claim 1, wherein the air intake conduit is disposed laterally between the driver and passenger seats.

6. The vehicle of claim 1, wherein the electric motor is disposed laterally between the driver and passenger seats.

7. The vehicle of claim 1, wherein central axes of the throttle body and of the air intake conduit are parallel to a longitudinal centerline of the vehicle.

8. The vehicle of claim 1, wherein the air intake conduit is ellipsoidal.

9. The vehicle of claim 1, further comprising a continuously variable transmission (CVT) operatively connected to the engine; and
   wherein the CVT and the electric motor are disposed on opposite sides of a longitudinal centerline of the vehicle.

10. The vehicle of claim 1, further comprising a console positioned between the driver seat and the passenger seat, the console defining in part a central cooling tunnel;
    wherein the electric motor is disposed inside the central cooling tunnel.

11. The vehicle of claim 2, wherein the electric motor is disposed vertically higher than a top of the engine.

12. The vehicle of claim 3, wherein the electric motor is disposed vertically higher than a top of a front of the driver and passenger seats.

13. The vehicle of claim 4, wherein the electric motor is disposed forwardly of a front of the driver and passenger seats.

14. The vehicle of claim 1, wherein the air intake conduit is a plenum chamber; and
    wherein a longitudinal centerline of the vehicle extends through the plenum chamber.

15. The vehicle of claim 1, wherein the air intake conduit is a first air intake conduit;
    the vehicle further comprising:
    a second air intake conduit fluidly connected to the throttle body upstream of the throttle body; and
    an air box fluidly connected to the second air intake conduit upstream of the second air intake conduit; and
    wherein a longitudinal centerline of the vehicle extends through the second air intake and the air box.

16. The vehicle of claim 15, wherein:
    a portion of the air box is vertically higher than a portion of the second air intake conduit;
    a portion of the second air intake conduit is vertically higher than a portion of the throttle body; and
    a portion of the throttle body is disposed vertically higher than the first intake conduit.

* * * * *

UNITED STATES PATENT AND TRADEMARK OFFICE
CERTIFICATE OF CORRECTION

PATENT NO. : 8,479,854 B1
APPLICATION NO. : 13/155959
DATED : July 9, 2013
INVENTOR(S) : Gagnon It is certified that error appears in the above-identified patent and that said Letters Patent is hereby corrected as shown below:

In the Claims

Column 13
Claim 1

Line 27, replace "... disposed near at least in part..." with --"... disposed at least in part..."--

Signed and Sealed this
Eighth Day of October, 2013

Teresa Stanek Rea
*Deputy Director of the United States Patent and Trademark Office*